United States Patent
Konishi

(10) Patent No.: US 7,602,999 B2
(45) Date of Patent: Oct. 13, 2009

(54) IMAGE SEARCHING DEVICE, IMAGE FORMING DEVICE, IMAGE SEARCHING METHOD, IMAGE SEARCHING PROGRAM, AND COMPUTER-READABLE STORAGE MEDIUM

(75) Inventor: Yohsuke Konishi, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 780 days.

(21) Appl. No.: 11/268,475

(22) Filed: Nov. 8, 2005

(65) Prior Publication Data

US 2006/0098231 A1    May 11, 2006

(30) Foreign Application Priority Data

Nov. 9, 2004   (JP) ............................. 2004-325556

(51) Int. Cl.
G06K 9/54 (2006.01)
G06K 9/00 (2006.01)
G06K 9/68 (2006.01)

(52) U.S. Cl. ..................... 382/305; 382/181; 382/218

(58) Field of Classification Search .............. 382/181, 382/209, 218, 305, 173, 190; 358/403, 3.21, 358/474; 707/1–10
See application file for complete search history.

(56) References Cited

U.S. PATENT DOCUMENTS

| | | | |
|---|---|---|---|
| 5,285,504 A * | 2/1994 | Pavlidis et al. | 382/176 |
| 5,465,353 A | 11/1995 | Hull et al. | |
| 5,933,823 A | 8/1999 | Cullen et al. | |
| 5,991,466 A | 11/1999 | Ushiro et al. | |
| 7,272,269 B2 * | 9/2007 | Tojo et al. | 382/305 |
| 7,412,602 B2 * | 8/2008 | Park et al. | 713/182 |

FOREIGN PATENT DOCUMENTS

| | | |
|---|---|---|
| EP | 0 990 997 A1 | 4/2000 |
| JP | 5-35799 A | 2/1993 |
| JP | 5-37748 A | 2/1993 |
| JP | 7-282088 A | 10/1995 |
| JP | 9-237282 A | 9/1997 |
| JP | 10-143638 A | 5/1998 |
| JP | 2000-112996 A | 4/2000 |
| JP | 2001-16379 A | 1/2001 |
| JP | 2005-149323 A | 6/2005 |

* cited by examiner

Primary Examiner—Daniel G Mariam
(74) Attorney, Agent, or Firm—Birch, Stewart, Kolasch & Birch, LLP

(57) ABSTRACT

The subject invention provides an image searching device ensuring both accuracy and speed in image searching operation. The image searching device comprises: characteristic generation section 10 for (i) receiving scan-image-information produced by an image scanning section which scans an original image, which is formed on a recording material according to original image information, and for (ii) extracting a characteristic of the scan-image-information, which is used for specifying the scan-image-information; acquisition section 11 for acquiring candidates for original image information corresponding to the scan-image-information, according to the characteristic, from a storage section 6 which stores a plurality of image information items; comparison section 14 for comparing each of the candidates for the original image information with the scan-image-information on a pixel basis; and determination section 12 for determining the original image information corresponding to the scan-image-information, according to a result of comparison by the comparing means.

11 Claims, 9 Drawing Sheets

IMAGE SEARCHING DEVICE, IMAGE FORMING DEVICE, IMAGE SEARCHING METHOD, IMAGE SEARCHING PROGRAM, AND COMPUTER-READABLE STORAGE MEDIUM

This Nonprovisional application claims priority under 35 U.S.C. § 119(a) on Patent Application No. 325556/2004 filed in Japan on Nov. 9, 2004, the entire contents of which are hereby incorporated by reference.

FIELD OF THE INVENTION

The present invention relates to an image searching device for carrying out search for image information corresponding to scan-image-information, which is scanned by an image scanning device; image forming device; image searching method; image searching program; and computer-readable storage medium.

BACKGROUND OF THE INVENTION

In a general copying apparatus, such as a photocopier, the original image placed on an original platen is irradiated with light from a light source, and the reflection light from the original image is converted into scan-image-information by an optical sensor, and the scan-image-information is subjected to various image compensations before outputted. However, it is still difficult to obtain scan-image-information exactly identical to the original image by the copying apparatus, because the reflection of the original image is not even at all times. Also, resolution for scanning the original image is limited; for example, small characters are often crushed in the scan-image-information.

Most of the original image placed on the original platen to be scanned is image information created in a computer and outputted by a printer or the like. Therefore, if the original image information exists, image quality is better for an output of the original information than the output of scan-image-information obtained through optical scanning of the original image by a copying apparatus.

As disclosed in Document 1 through 3, a particular image forming device is suggested in this view. This image forming device searches corresponding image information after scanning an original image, and if the corresponding image is found, outputs an image of the stored-image-information.

More specifically, Document 1 discloses a technique of image forming, which first carries out detection of characteristic quantity of scan-image-information, and searches for corresponding image information according to the characteristic quantity, and then carries out image forming based on the found image information. Document 2 discloses another matching technique, which carries out a vote for document files stored in a database to find a file with a descriptor identical to the descriptor denoting the extracted characteristic quantity of the input image, and the number of votes is counted. Further, Document 3 discloses a technique of carrying out search after the user selects document files by input from the keyword. Note that, in Document 3, the user is required to input the keyword (fraise) used for narrowing down the files, and therefore, depending on the selection of the keyword, the narrow-down of files may be carried out in an unwanted way.

The techniques of Documents 1 and 2 are not fully reliable in terms of accuracy when the characteristic quantity or the number of descriptors are small, and also the search will take a while when the characteristic quantity or the number of descriptors are large.

Further, the characteristic quantity or the descriptor only represent the feature of the original image, but are not the actual target images. Therefore, for example, if there are many image information items with similar characteristic quantities or descriptors, the foregoing search for desired image information may fail.

Further, if the search for the desired image is carried out by using the original image itself to find corresponding image information to the scan-image-information, the processing time significantly increases in proportion to the amount of original images.

Accordingly, those conventional methods are not useful to satisfy both improvement in searching accuracy of desired image information and quick search.

(Document 1)
Japanese Unexamined Patent Publication No. Tokukai 2001-16379(published on Jan. 19, 2001)

(Document 2)
Japanese Unexamined Patent Publication No. Tokukaihei 07-282088 (published on Oct. 27, 1995)

(Document 3)
Japanese Unexamined Patent Publication No. Tokukaihei 09-237282 (published on Sep. 9, 1997)

SUMMARY OF THE INVENTION

The present invention is made in view of the foregoing problem, and an object is to provide an image searching device ensuring both accuracy and quick operation in image search, which has not been achieved by the conventional device.

In order to solve the foregoing problem, an image searching device according to the present invention comprises: characteristic generating means for (i) receiving scan-image-information produced by an image scanning device which scans an original image, which is formed on a recording material according to original image information, and for (ii) extracting a characteristic of the scan-image-information, which is used for specifying the scan-image-information; acquiring means for acquiring candidates for original image information corresponding to the scan-image-information, according to the characteristic, from a storage device which stores a plurality of image information items; comparing means for comparing each of the candidates for the original image information with the scan-image-information on a pixel basis; and determining means for determining the original image information corresponding to the scan-image-information, according to a result of comparison by the comparing means.

With this arrangement, some candidates for the original image information are acquired among the plurality of image information items stored in the storage device, and then the candidates of original image information are compared with the scan-image-information on the pixel basis. In this manner, the original image information, from which the original image is created, is determined.

In this manner, the candidates for the original image information and the scan-image-information are compared with each other on the pixel basis, thereby more accurately determining original image information, compared with the conventional structure in which the original image information is determined only based on the characteristic of the scan-image-information. Further, this arrangement also allows rapid determination of the original image information, compared with the method of comparing the scan-image-information with all of the plural image information items stored in the storage device.

Accordingly, this structure allows rapid and accurate determination of the original image information, from which the original image is created, compared with the conventional structure.

Note that, the scan-image-information may be transmitted directly from the image scanning device, or may be acquired through an external device, such as a server, from the image scanning device.

In order to solve the foregoing problem, an image forming device according to the present invention comprises: the image searching device and image forming means for forming the scan-image-information or the original image information determined by the image searching device.

With this arrangement, image forming is carried out with respect to the scan image information and the original image information determined by the image searching device. On this account, when the original image information exists, image forming is carried out with respect to the found image information.

In order to solve the foregoing problem, an image searching method according to the present invention comprises the steps of: (i) extracting a characteristic of scan-image-information, which is produced by an image scanning device which scans an original image formed on a recording material according to original image information, so as to use the characteristic for specifying the scan-image-information; (ii) acquiring candidates for original image information corresponding to the scan-image-information, according to the characteristic, from a storage device which stores a plurality of image information items; (iii) comparing each of the candidates for the original image information with the scan-image-information on a pixel basis; and (iv) determining the original image information corresponding to the scan-image-information, according to a result of comparison in the step (iii).

With this arrangement, some candidates for the original image information are acquired among the plurality of image information items stored in the storage device, and then the candidates of original image information are compared with the scan-image-information on the pixel basis. In this manner, the original image information, from which the original image is created, is determined.

Accordingly, this structure allows rapid and accurate determination of the original image information, from which the original image is created, compared with the conventional structure.

Note that, the image forming device and the image searching device may be realized by a computer. In this case, the scope of the present invention includes an image forming program for the image forming device and the image searching device, which causes a computer to execute the foregoing various means, so that the image forming device and the image searching device are realized by a computer. Further, an image searching program and a computer-readable storage medium storing these programs are also included in the scope of the present invention.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

Figure 1:
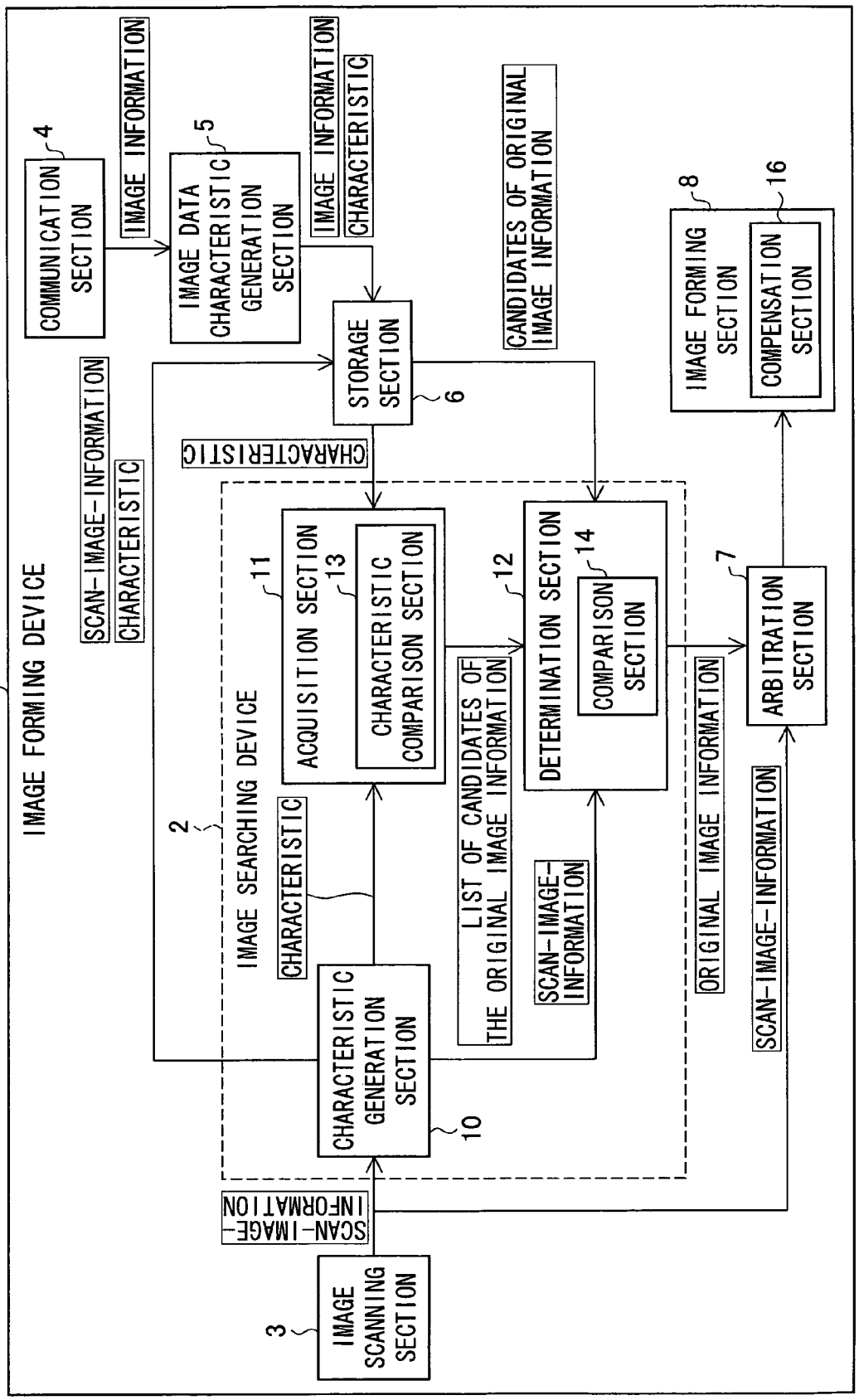
FIG. 1 is a block diagram illustrating a schematic structure of an image forming device according to one embodiment of the present invention.

One embodiment of the present invention is described below.

An image searching device 2 according to the present embodiment carries out a plurality of matching steps so as to accurately compare scan-image-information and plural selections of stored original image information items. Specifically, an original image is first optically scanned by a document scanning device, and the characteristic (characteristic quantity) of the obtained scan-image-information is detected so as to extracts plural selections of original image information from a storage device, and the plural items are further compared with the scan-image-information. In this way, image information corresponding to the original image can be quickly found in an accurate manner.

The following explains an image forming device 1 including an image searching device 2. Note that, though the image forming device 1 includes an image scanning section 3 in the following example, the image scanning section 3 is not always provided. The image forming device 1 according to the present invention is required to include at least the image searching device 2 and an image forming section 8.

Note that, in the following explanation, "original image" means a record of original image information. More specifically, "Original image" is a recording material, such as a paper, on which original image information is recorded. Meanwhile, "Scan-image-information" means image data obtained by optically scanning of the original image by an image scanning device. Therefore, the "Original image" and the "Scan-image-information" are substantially identical, but are slightly different, as the scan-image-information is obtained through optical scanning process. Further, "Image information" means the original image information, the scan-image-information, other information regarding an image, or an actual image, including stored-image-information items stored in a storage section 6 (described later).

FIG. 1 is a block diagram illustrating a schematic structure of the image forming device 1 according to the present embodiment. The image forming device 1 includes an image scanning section 3, an image searching device 2, a arbitration section 7, an image forming section 8, a storage section 6, an image data characteristic generation section 5 and a communication section 4.

The image scanning section 3 optically scans an original image placed on a original platen (not shown) of the image forming device 1 using a image-capturing element or the like, thereby obtaining scan-image-information. The image scanning section 3 may be realized by a scanner or the like.

The communication section 4 carries out transmission/reception of various information items with plural devices connected to the image forming device 1 via a network. The image information obtained form an external device includes image information. That is, the communication section 4 receives image information externally supplied.

The image data characteristic generation section 5 (image information characteristic generating means) extracts characteristics of the image information received by the communication section 4. Note that, this step of extracting characteristics by the image data characteristic generation section 5 is the same as the operation performed by the characteristic generation section 10, which is described later. The minute description of the method is therefore omitted here.

The storage section 6 at least stores image information (in the following explanation, "stored-image-information" indicates the image information stored in the storage section 6). Further, in the present embodiment, the storage section 6 stores storage image information and the characteristic of the stored-image-information, which are associated with each other. The image forming section 8 carries out image forming of the scan-image-information captured by the image scanning section 3 and the original image information determined by the image searching device 2 (described later). Further, the image forming section 8 includes a compensation section 16, which serves to compensate the image information (original image information, scan-image-information) to be subjected to image forming, according to the attribute of the image forming section 8. With this function, the original image information or the scan-image-information is compensated, for example, for the gradation, before outputted from the image forming section 8. Note that, when the scan-image-information and the original image information transmitted to the image forming section 8 has been already through some processing according to the attribute of the image forming section 8, the image information is subjected directly to image forming without the compensation process by the compensation section 16.

The image searching device 2 carries out judgment as to whether the scan-image-information scanned by the image scanning section 3 exists in a plurality of the stored-image-information items in the storage section 6. When the same image information exists, the image searching device 2 acquires the same original image information as the scan-image-information from the storage section 6. The image searching device 2 is more specifically described later.

The arbitration section 7 serves to determine which of the original image information, which is selected by the image searching device 2, and the scan-image-information is going to be subjected to image forming. More specifically, when the image searching device 2 selects original image information corresponding to the scan-image-information, the arbitration section 7 brings the image forming section 8 into operation so that the image forming section 8 carries out image forming of the original image information. In contrast, when the image searching device 2 does not pick original image information corresponding to the scan-image-information, that is, no original image information corresponding to the scan-image-information is found in the storage section 6, the arbitration section 7 brings the image forming section 8 into operation so that the image forming section 8 carries out image forming of the scan-image-information.

The following explains a structure of the image searching device 2.

The image searching device 2 includes a characteristic generation section 10, an acquisition section 11 and a determination section 12.

The characteristic generation section 10 serves to extract characteristic of the scan-image-information obtained by the image scanning section 3. The characteristic is used as information for specifying the scan-image-information. Example of the characteristic may be the type, or area dividing data indicating layout of the image stored in the scan-image-information. More specifically, the characteristic generation section 10 classifies a plurality of information items, which is generated by dividing the scan-image-information according to the plural rectangle blocks (areas), into, for example, character area, halftone area, continuous tone area etc. Then, the characteristic generation section 10 detects the ratio of each of the divided area so as to use the ratios as the characteristic. However, this factor is only an example, and any other factors which can specify the scan-image-information may be used. For example, the details of the layout of the scan-image-information, that is, the condition of the layout of respective areas (e.g., character area, halftone area, continuous tone area) may be used as a factor of characteristic. In such a manner, the characteristic generation section 10 extracts characteristic of the scan-image-information. The extraction of characteristic of the image information by the image data characteristic generation section 5, which is described above, is performed in the same manner as this method performed by the characteristic generation section 10.

The acquisition section 11 obtains one or more of stored-image-information items (candidates for original image information) similar to the scan-image-information among the plural stored-image-information items stored in the storage section 6, based on the characteristic of the scan-image-information generated by the characteristic generation section 10. In other words, the acquisition section 11 acquires candidate(s) of the original image information corresponding to the scan-image-information, from the storage section 6, which stores the plural image information items, based on the characteristic of the scan-image-information. More specifically, the acquisition section 11 compares the characteristic of the scan-image-information with the characteristic of each of the stored-image-information items in the storage section 6, and picks all stored-image-information items with certain difference values, which is smaller than a threshold, as the candidates for original image information.

The acquisition section 11 includes a characteristic comparison section 13. The characteristic comparison section 13 carries out the comparison between the characteristic of the scan-image-information and the characteristic of the stored-image-information. More specifically, for example, when using the ratio of specific image areas (character area, halftone area, continuous tone area etc.) of the image information (scan-image-information, stored-image-information) as the factor of characteristic, the characteristic comparison section 13 compares the two ratios of the scan-image-information and one of the stored-image-information items in the storage section 6, and finds the difference. The characteristic comparison section 13 carries out this comparison for all of the stored-image-information items in the storage section 6. Then, according to the comparison result, the acquisition section 11 obtains a list of the stored-image-information items with the difference values smaller than the threshold value; that is, the acquisition section 11 obtains a list of the stored-image-information items with high possibilities of matching with the characteristic of the scan-image-information, and creates a list of candidates for the original image information items. Then, the acquisition section 11 transmits the list of candidates for the original image information items to a determination section 12. Note that, though the acquisition section 11 acquires a list of candidates for the original image information items in this example, the acquisition section 11 may acquire actual original image information items selected as candidates.

The determination section 12 serves to acquire the candidates for the original image information items from the storage section 6 based on the list of candidates for the original image information items compare made by the acquisition section 11, and carries out comparison between the scan-image-information and each candidate of the stored-image-information on the pixel basis. The determination section 12 includes a comparison section 14. The determination section 12 compares the scan-image-information and the stored-image-information on the pixel basis, and finds the result also on the pixel basis.

Then, according to the comparison result, the determination section 12 (1) determines whether or not the difference between the stored-image-information and the scan-image-information is smaller than a threshold, and if there are plural of information items with the difference values smaller than the threshold, (2) further selects one with the smallest value as the original image information. In this manner, the image searching device 2 searches image information corresponding to the scan-image-information scanned by the image scanning section 3, among the information items in the storage section 6.

Here, with reference to FIG. 1, the following explains about the information exchanged among the respective function blocks of the present embodiment.

The scan-image-information obtained by the image scanning section 3 is transmitted to the characteristic generation section 10 and to the arbitration section 7. Then, the characteristic generation section 10 generates a characteristic based on the scan-image-information received from the image scanning section 3. Further, the characteristic generation section 10 transmits the characteristic to the acquisition section 11, transmits the scan-image-information and the characteristic to the storage section 6, and transmits the scan-image-information to the determination section 12. The transmission of the scan-image-information and the characteristic to the storage section 6 is carried out at a time when the image forming of the scan-image-information is completed, so that the acquisition section 11 excludes the scan-image-information and the characteristic created by the characteristic generation section 10 in the current round.

Next, the acquisition section 11 compares the characteristic received from the characteristic generation section 10 with the characteristic of the stored-image-information in the storage section 6, and creates a list of candidates for the original image information, and transmits the list to the determination section 12.

The determination section 12 searches for the image-information corresponding to the list of candidates for the original image information obtained from the acquisition section 11, and acquires the information items from the storage section 6. Then, the comparison section 14 carries out comparison on the pixel basis between each of the candidates for the original image information with the scan-image-information received from the characteristic generation section 10. Then, according to the comparison result given by the comparison section 14, the determination section 12 determines whether the candidates for the original image information include any items corresponding to the scan-image-information. When the corresponding information item is found in the candidates, the determination section 12 transmits the information item(s) corresponding to the scan-image-information to the arbitration section 7 as the original image information.

When receiving original image information item(s) corresponding to the scan-image-information from the image searching device 2, the arbitration section 7 transmits the received original image information to the image forming section 8. On the other hand, when no original image information item(s) corresponding to the scan-image-information is sent from the image searching device 2, the arbitration section 7 transmits the scan-image-information, which is received from the image scanning device, to the image forming section 8. To determine whether or not the original image information item(s) corresponding to the scan-image-information is transmitted from the image searching device 2, the arbitration section 7 may use a predetermined time period as the limit for receiving the image information item(s) from the image searching device 2. In this case, for example, the period is counted from the time when the scan-image-information is sent from the image scanning section 3. As another example, when the storage section 6 has no original image information item(s) corresponding to the scan-image-information, the image searching device 2 may transmit a message indicating no-matching of the scan-image-information and the stored-image-information, to the arbitration section 7.

Figure 2:
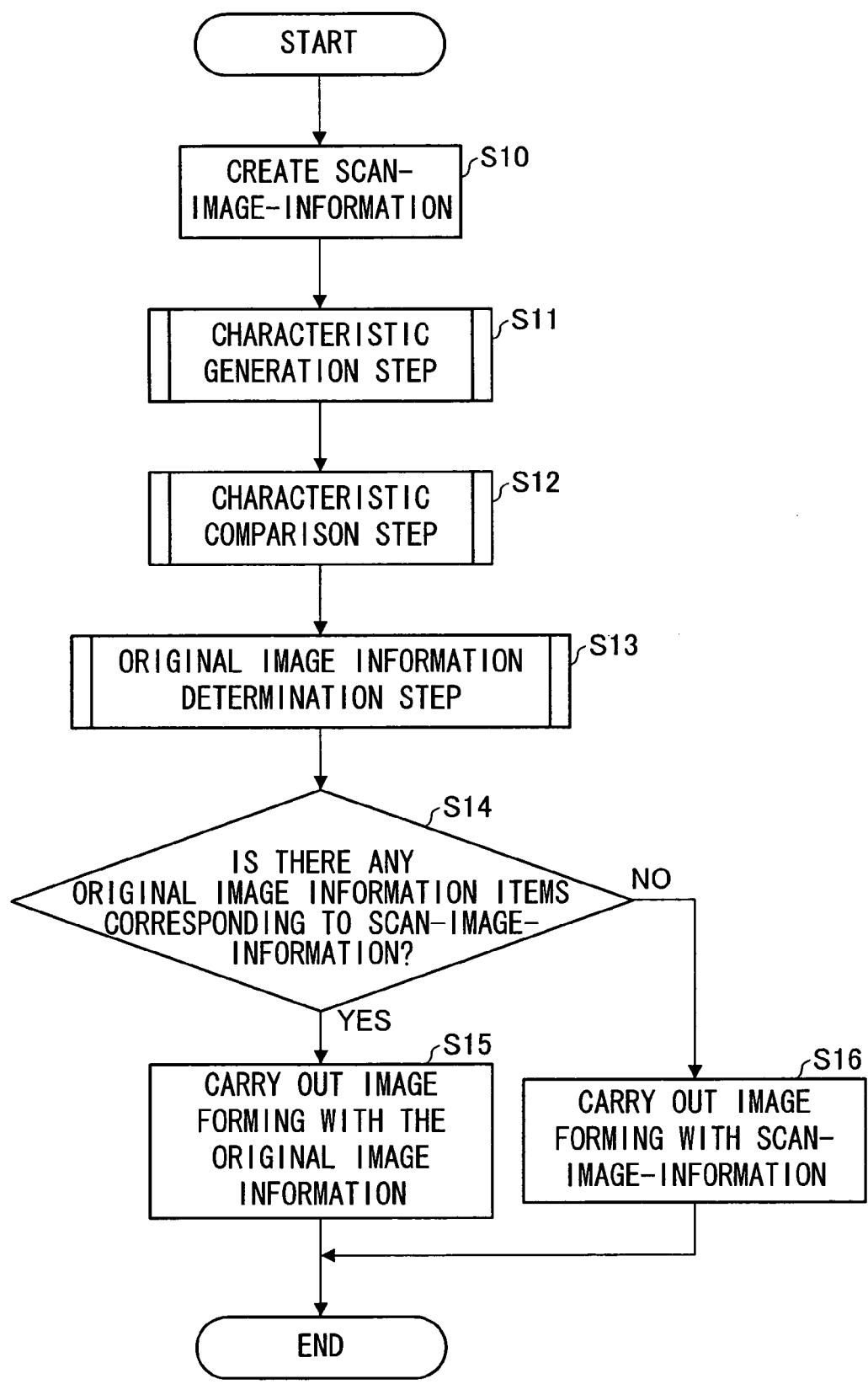
FIG. 2 is a flow chart for showing an image forming operation in the foregoing image forming device.

FIG. 2 is a flow chart for showing an image forming operation in the foregoing image forming device 1. With reference to this FIG. 2, the following describes image forming process according to the present embodiment.

First, an original image is placed on the original platen of the image forming device 1 by the user, and an image forming command is made subsequently. Then, the image scanning section 3 creates the scan-image-information in the optical manner (S10). Next, the image scanning section 3 transmits the scan-image-information to the characteristic generation section 10. The characteristic generation section 10 carries out characteristic generation step for generating a characteristic of the scan-image-information (S11), and transmits the created characteristic to the acquisition section 11. Then, the acquisition section 11 causes the characteristic comparison section 13 to carry out characteristic comparison step for comparing the generated characteristic with the characteristics of image information items stored in the storage section 6 (S12). According to this comparison result given by the characteristic comparison section 13, a list of the candidates for the original image information, which is a list of original image information items similar to the scan-image-information, is created. The list is transmitted from the acquisition section 11 to the determination section 12. On receiving the list of candidates for the original image information, the determination section 12 acquires the original image information items of the list from the storage section 6. Then, the determination section 12 causes the comparison section 14 to compare the scan-image-information and the candidates for the original image information, thereby carrying out an original image information determination step, which determines the original image information (S13).

Next, the arbitration section 7 carries out judgment as to whether or not the original image information is received from the image searching device 2 (S14). In other words, the arbitration section 7 carries out judgment as to whether or not the scan-image-information corresponding to the scan-image-information exists in the storage section 6. When the judgment in S14 found that the scan-image-information corresponding to the scan-image-information exists, the arbitration section 7 transmits the original image information item(s) to the image forming section 8, so as to cause the image forming section 8 to carry out image forming with the information item (S15). On the other hand, when the judgment in S14 found that the scan-image-information corresponding to the scan-image-information does not exist, the arbitration section 7 transmits the scan-image-information to the image forming section 8, so as to cause the image forming section 8 to carry out image forming with the scan-image-information (S16). In this manner, the image forming device 1 carries out image forming. Next, the foregoing steps are more specifically explained.

Figure 3:
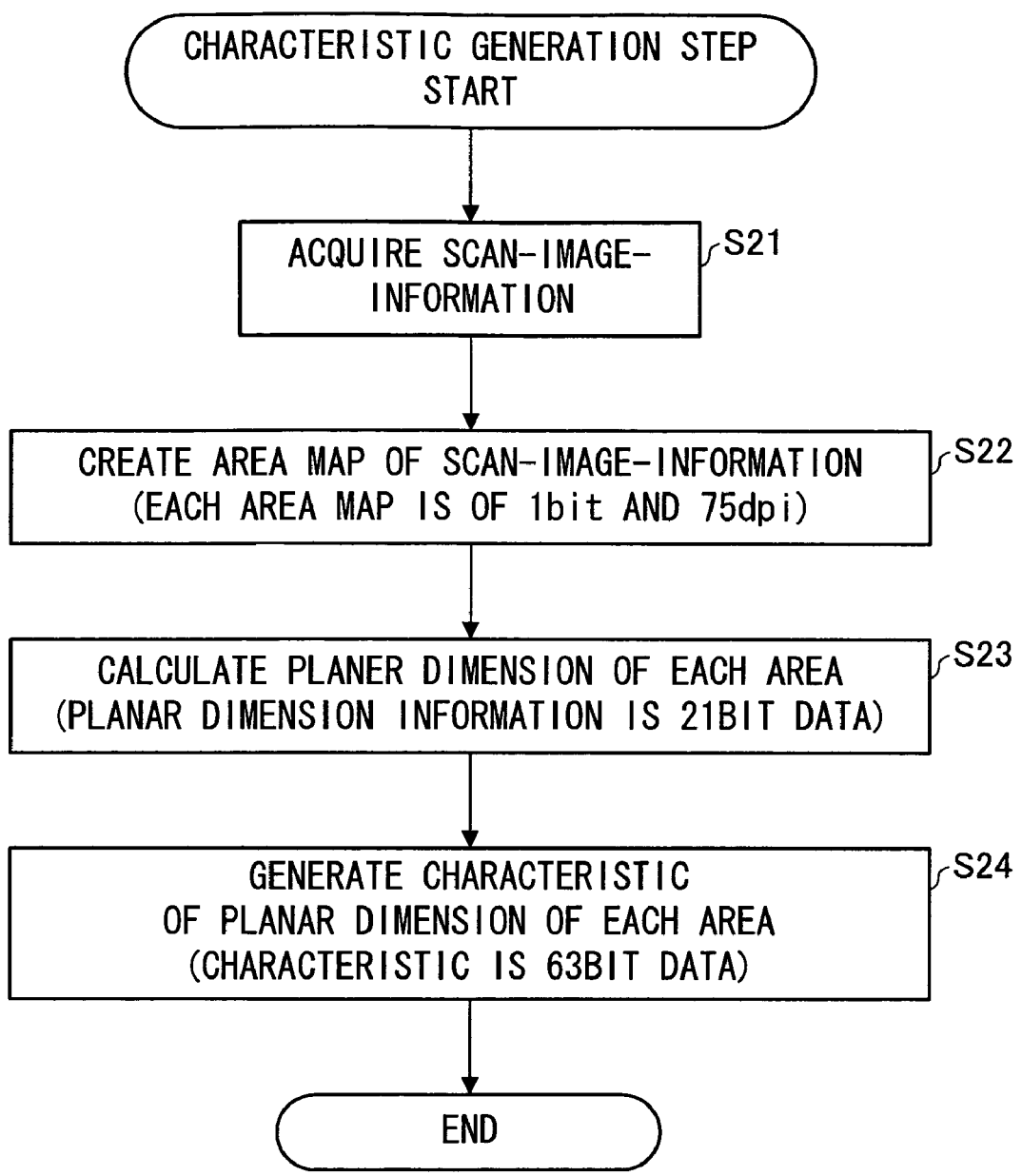
FIG. 3 is a flow chart for showing a characteristic generation step.

FIG. 3 is a flow chart for showing a characteristic generation step. The following explains this characteristic generation step, which is performed by the characteristic generation section 10.

First of all, the image scanning section 3 optically scans an original image, and creates the scan-image-information (S21). Then, the characteristic generation section 10 acquires the scan-image-information.

Next, the characteristic generation section 10 divides the acquired scan-image-information (the resolution is 600 dpi in this example) into rectangles of 8×8 dot. Then, the characteristic generation section 10 classifies the created rectangle areas into a character area, a background-area, and other area (dot, continuous tone area). At this point, each area map is data of 1 bit and 75 dpi. In this manner, the characteristic generation section 10 creates an area map (area division data) from the scan-image-information (S22).

Next, with the created area map, the characteristic generation section 10 calculates the planer dimension of each area so as to create "planar dimension information" (S23). The created planar dimension information is 21 bit data.

Further, the characteristic generation section 10 calculates the characteristic based on the created planar dimension information (S24). More specifically, the characteristic generation section 10 uses relative ratios of the respective planar dimension information items as the characteristic, for example. Alternatively, planar dimension ratios of those areas (or a planer dimension ratio of one specific area) with respect to the whole scan-image-information may be used as the characteristic. The created planar dimension information is 63 bit data. In this manner, the characteristic generation section 10 generates the characteristics.

Figure 4:
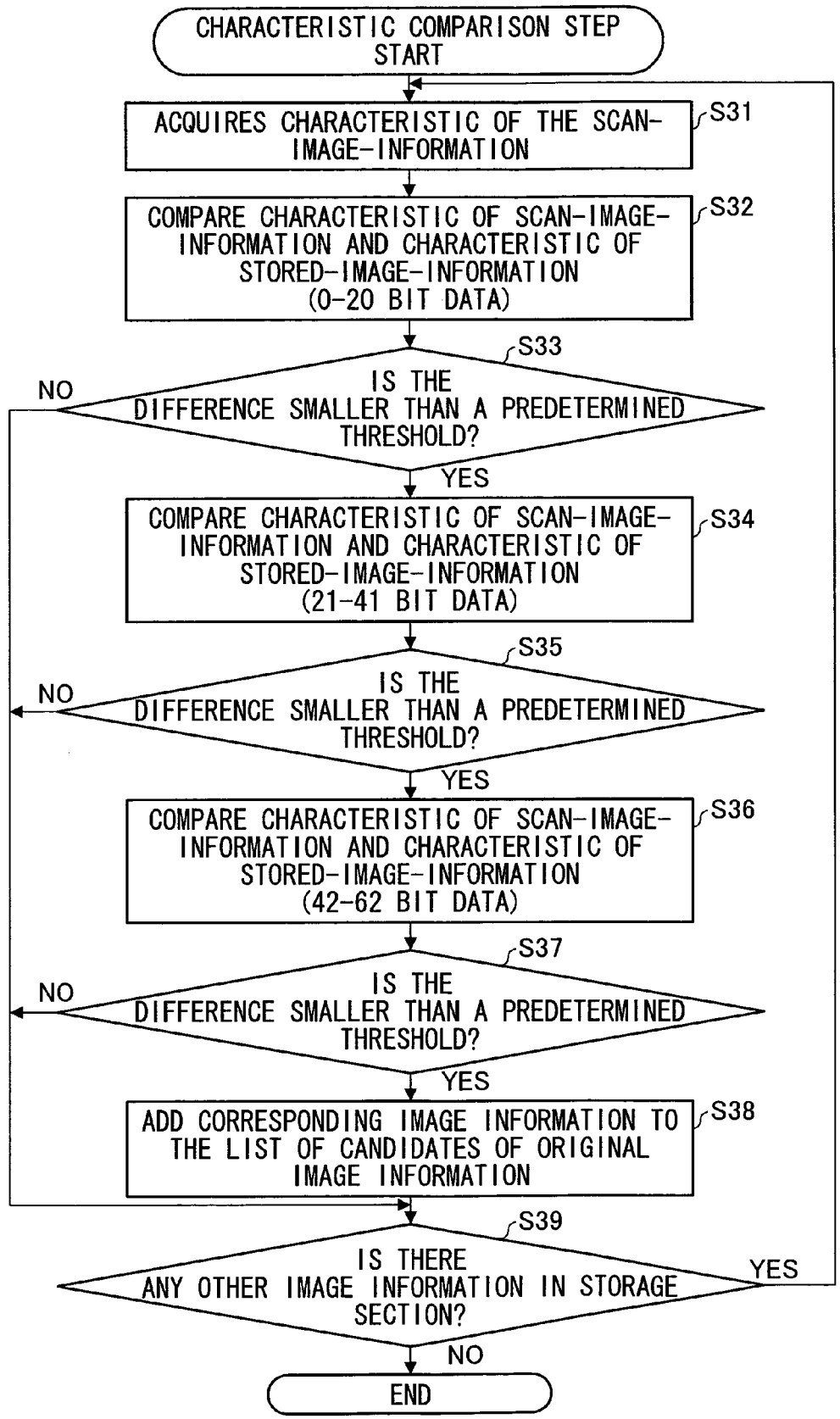
FIG. 4 is a flow chart for showing a characteristic comparison step.

FIG. 4 is a flow chart for showing a characteristic comparison step. The following explains the step of creating a list of candidates for the original image information, performed by the acquisition section 11.

The acquisition section 11 acquires the characteristic of the scan-image-information (this is hereinafter referred to as a scan-image characteristic) generated by the characteristic generation section 10 (S31). Further, the acquisition section 11 also acquires the characteristic of the stored-image-information in the storage section 6 (this is hereinafter referred to as a stored-image characteristic).

Next, the characteristic comparison section 13 extracts 0-20 bit data items respectively from the scan-image-information and from the stored-image-information, and compares these data items (S32). More specifically, the characteristic comparison section 13 compares the scan-image-information and the stored-image-information in terms of 21 bit data.

Further, the characteristic comparison section 13 compares the respective 0-20 bit data items of the scan-image-information and the stored-image-information, and determines whether the difference is smaller than a predetermined threshold (S33).

Then, when the step S33 found that the difference is smaller than the predetermined threshold, the characteristic comparison section 13 takes out 21-41 bit data items respectively from the scan-image-information and from the stored-image-information, and compares these data items (S34).

Further, the characteristic comparison section 13 compares the respective 21-41 bit data items of the scan-image-information and the stored-image-information, and determines whether the difference is smaller than a predetermined threshold (S35).

Then, when the step S33 found that the difference is smaller than the predetermined threshold, the characteristic comparison section 13 takes out 42-62 bit data items respectively from the scan-image-information and from the stored-image-information, and compares these data items (S36).

Further, the characteristic comparison section 13 compares the respective 42-62 bit data items of the scan-image-information and the stored-image-information, and determines whether the difference is smaller than a predetermined threshold (S37).

Then, when the step S37 found that the difference is smaller than the predetermined threshold, the characteristic comparison section 13 add the image information to the list of candidates for the original image information (S38). More specifically, when the comparison by the characteristic comparison section 13 found that the difference between the scan-image-information and the stored-image-information is smaller than the predetermined threshold, the characteristic comparison section 13, the image information is added to the list of candidates for the original image information.

Next, the acquisition section 11 judges whether or not the storage section 6 has any characteristic (or corresponding stored-image-information) which has not been compared with the characteristic of the scan-image-information (S39). More specifically, the acquisition section 11 checks if there is a characteristic which has not been subjected to comparison in the storage section 6. Then, when the step S39 found that there is no characteristic (of the stored-image-information) for comparison left, the characteristic comparison step is completed. Meanwhile, when the step S39 found that there is a characteristic (of the stored-image-information) which has not been subjected to comparison, the sequence goes back to the step S31.

Further, when the steps S33, S35 and S37 found that the difference is larger than the predetermined threshold, the characteristic comparison section 13 determines that the stored-image-information, corresponding to the characteristic which has been compared, is different from the scan-image-information. Then, the sequence goes back to the step S39.

Figure 5:
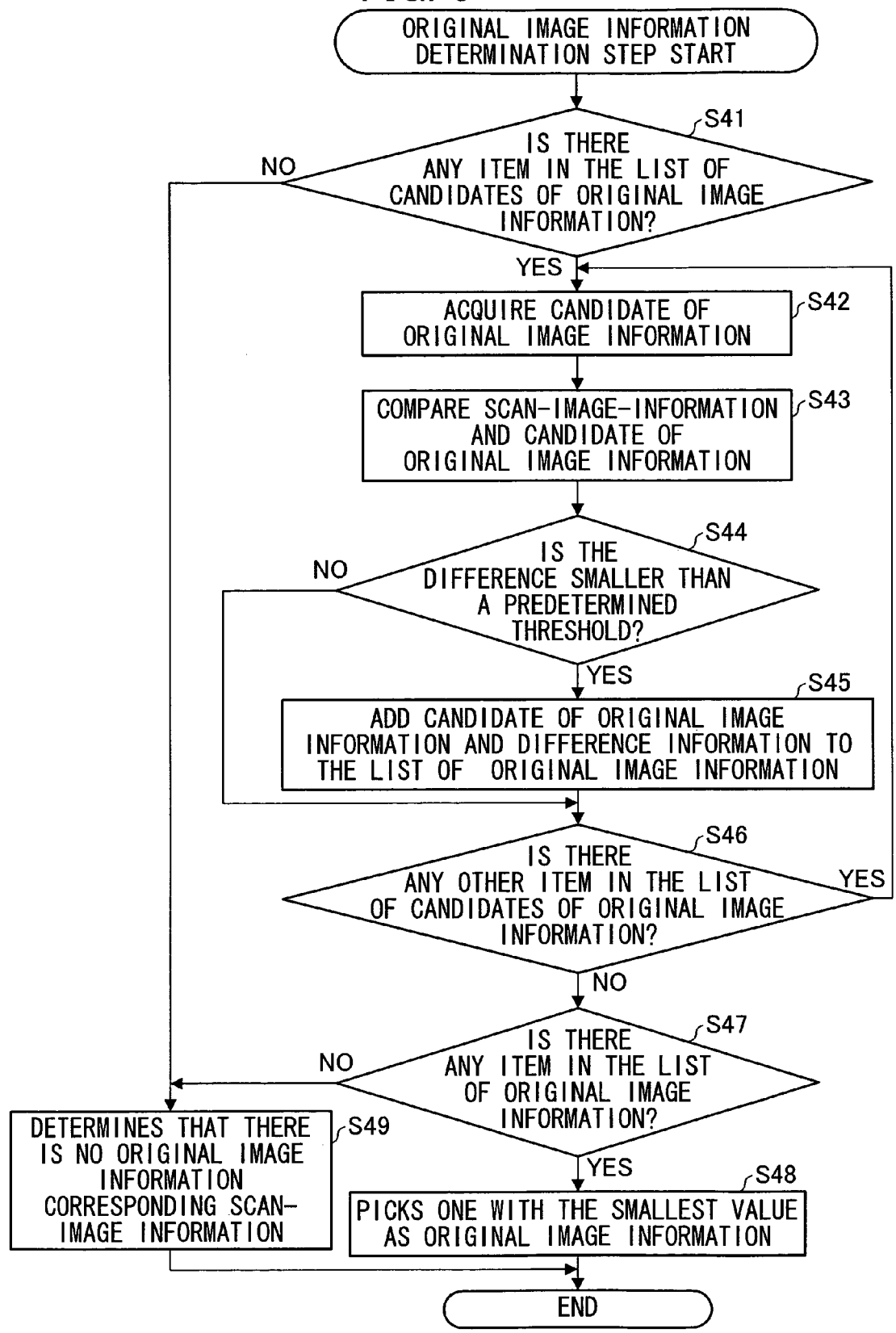
FIG. 5 is a flow chart for showing an original image information determination step.

FIG. 5 is a flow chart for showing an original image information determination step. The following explains a step for determining original image information corresponding to the scan-image-information by the determination section 12 using the list of candidates for the original image information and the scan-image-information. First, the determination section 12 acquires the list of candidates for the original image information created by the acquisition section 11. Further, the determination section 12 acquires the scan-image-information from the image scanning section 3.

Then, with reference to the list of candidates for the original image information, the determination section 12 carries out judgment as to whether or not there is any item in the list of candidates for the original image information (S41).

When the step S41 found that there is one or more items in the list of candidates for the original image information, the determination section 12 acquires the item (image information) from the list of candidates for the original image information (S42).

Next, the comparison section 14 compares the scan-image-information and the original image information on the pixel basis (S43), and found the difference.

According to the result of comparison in the step S43, the comparison section 14 judges whether or not the difference is smaller than the predetermined threshold (S44).

Then, when the judgment found that the difference is smaller than the threshold value, the comparison section 14 add the original information compared by the comparison section 14 and the information of difference (difference information, hereinafter) found in the step S43 to the list of candidates for the original image information (S45).

After that, the determination section 12 judges whether or not the list of candidates for the original image information includes any image information item which has not been compared with the scan-image-information (S46). Then, when the step S46 found that there is no image information item to be compared with the scan-image-information left, the determination section 12 judges whether or not there is any item in the list of candidates for the original image information (S47).

Further, when the step S47 found that one or more items exist in the list of candidates for the original image information, the determination section 12 refers to the difference information, which is the information of difference with the scan-image-information attached to the list of the original image information items, and picks one with the smallest value as the original image information (S48). In this way, the original image information corresponding to the scan-image-information is selected form the list of candidates for the original image information. Then, the determination section 12 transmits the selected original information item to the arbitration section 7.

When the step S46 found that there is an image information item which has not been compared with the scan-image-information in the list of candidates for the original image information, the sequence goes back to the step S42.

Further, when the step S41 found that one or more items exist in the list of candidates for the original image information, or when the step S47 found that the list of candidates for the original image information has no item, the determination section 12 determines that there is no original image information.

As described, the image searching device 2 according to the present invention includes a characteristic generation section 10, an acquisition section 11, a characteristic comparison section 13, and a determination section 12. The characteristic generation section 10 receives the scan-image-information obtained by the image scanning section 3, which optically scans an original image formed on a recording material based on the original image information, and extracts a characteristic from the scan-image-information for specifying the scan-image-information. The acquisition section 11 acquires candidates for the original image information among which the original image information corresponding to the scan-image-information is selected according to the characteristic, from the plural image information items stored in the storage section 6. The characteristic comparison section 13 compares the candidates for the original image information and the scan-image-information on the pixel basis. The determination section 12 determines the original image information corresponding to the scan-image-information, according to the result of comparison by the characteristic comparison section 13.

With this arrangement, first, the candidates for the original image information is acquired from the plural image information items stored in the storage section 6, according to the characteristic of the scan-image-information, then the candidates for the original image information and the scan-image-information are compared on the pixel basis, and the original image information, from which the original image is created, is determined.

In this manner, the candidates for the original image information and the scan-image-information are compared with each other on the pixel basis, thereby more accurately determining original image information, compared with the conventional structure in which the original image information is determined only based on the characteristic of the scan-image-information. Further, this arrangement also allows rapid determination of the original image information, compared with the method of comparing the scan-image-information with all of the plural image information items stored in the storage section 6.

Accordingly, this structure allows rapid and accurate determination of the original image information, from which the original image is created, compared with the conventional structure.

Note that, the scan-image-information may be transmitted directly from the image scanning section 3, or may be acquired through an external device, such as a server, from the image scanning section 3.

Further, the image searching device 2 according to the present invention is preferably arranged so that the determining section 12 narrows down the candidates for the original image information by selecting items whose difference is smaller than a predetermined threshold according to the result of comparison by the characteristic comparing section 13, and then further selecting a candidate with a smallest value as the original image information.

With this arrangement, each of the candidates for the original image information and the scan-image-information are compared by the characteristic comparison section 13, and the smallest item with the difference value less than the threshold is selected as the original image information. According to this, any data items with the difference equal to or more than the threshold value is excluded. Further, when there are plural candidates for the original image information with the difference smaller than the threshold, the smallest item is selected as the original image information. On this account, it is possible to reduce defect that the selected image information item turns out not corresponding to the scan-image-information.

Further, the image searching device 2 according to the present invention is preferably arranged so that: the characteristic generation section 10 divides the scan-image-information into a plurality of areas and determines a type of each area. Further, the acquisition section 11 extracts at least one ratio of type of area with respect to an entire area of the scan-image-information and/or positions of area of a specific type so as to use the ratio and/or the positions as the characteristic.

"Division of the scan-image-information into a plurality of areas" means dividing the scan-image-information corresponding to the plural divided areas of the image denoted by the scan-image-information.

With this arrangement, the scan-image-information is divided into a plurality of areas, and the candidates for the original image information are acquired based on the type of image of each of the divided areas. An example of the "division of the scan-image-information into a plurality of areas" is forming a single area from a scanned portion constituted of a plurality of pixels. More specifically, the type of image for each area is found in a unit of 8×8 dot rectangle.

Further, the acquisition section 11 acquires candidates of original image information, based on the ratio of each type of image with respect to the whole of the scan-image-information, and/or based on the position of each type of image of the scan-image-information. With this manner, the image information items stored in the storage section 6 can be easily classified, and it is not necessary to carry out comparison for all of the image information items in the storage section 6. On this account, the original image information is determined more quickly.

Further, the image searching device 2 according to the present invention is preferably arranged so that: the characteristic generating means 10 divides the scan-image-information into a plurality of areas. Also, the image searching device 2 includes an area division section 34 for classifying the areas into a character area, a halftone area, a continuous tone area, and a background area. Further, the acquisition section 11 extracts a ratio of each area so as to use the ratio as the characteristic.

"Division of the scan-image-information into a plurality of areas" means dividing the scan-image-information corresponding to the plural divided areas of the image denoted by the scan-image-information.

With this arrangement, after the scan-image-information is divided into the plurality of areas, the resulting areas are classified into a character area, a halftone area, and a continuous tone area; and the ratio for each area is used as the factor of obtaining the candidates for the original image information. In this manner, the image information items in the storage section 6 may be classified with an easy method, thereby further reducing the time for determining the original image information corresponding to the scan-image-information.

Further, the image searching device 2 according to the present invention is preferably arranged so that: the characteristic generation section 10 divides the scan-image-information into a plurality of areas. Also, the image searching device 2 includes an area division section 34 for classifying the areas into a character area, a halftone area, a continuous tone area, and a background area. Further, the acquisition section 11 extracts ratios of the areas so as to use one of the ratios as the characteristic, the area of the ratio to be used as the characteristic being selected depending on the degree of the ratio.

With this arrangement, after the scan-image-information is divided into the plurality of areas, the resulting areas are classified into a character area, a halftone area, a continuous tone area, and a background area; and the ratio of one of the areas with respect to the whole scan-image-information is used as the factor of obtaining the candidates for the original image information. In this manner, the image information items in the storage section 6 may be classified with an easy method, thereby further reducing the time for determining the original image information corresponding to the scan-image-information. Further, the area used for the factor of obtaining the candidates for the original image information is determined depending on the ratio of the area. More specifically, when the area used for the factor of obtaining the candidates for the original image information is significantly small, it includes a considerable amount of error, and acquisition of candidates for the original image information may not be properly carried out. In view of this problem, an area with a relatively large ratio with respect to the whole scan-image-information is used for the factor, so as to reduce the error. By thus determining the area used as the factor of obtaining the candidates for the original image information depending on the ratio of the area, the acquisition of candidates for the original image information is more securely performed.

Further, the image searching device 2 according to the present invention preferably further comprises: inputting means for inputting user information; and restriction section 20 for restricting the candidates for the original image information acquired by the acquisition section 11, according to the user information, wherein: the storage section 6 stores the user information by associating the user information with one of the image information items.

With this arrangement, the image information and the user information are related with each other, and the candidates for the original image information are narrowed down based on the user information supplied to the image searching device 2. This method allows the user to narrow down the determination in a desired way, for example, so that the original image information is given only to a specific user.

Further, the image searching device 2 according to the present invention preferably further comprises: restriction section 20 for restricting the candidates for the original image information acquired by the acquiring means, according to user information, wherein: the storage section 6 stores the user information by associating the user information with one of the image information items, the characteristic generation section 10 acquires the scan-image-information and the user information corresponding to the scan-image-information from the image scanning section 3.

With this arrangement, the image information and the user information are related with each other, and the candidates for the original image information are narrowed based on the user information related to the scan-image-information. This method allows the user to narrow down the determination in a desired way, for example, so that the original image information is given only to a specific user.

Further, the image searching device 2 according to the present invention is preferably arranged so that: the storage section 6 stores user information, which is associated with one of the image information items, the characteristic generation section 10 acquires the scan-image-information and the user information corresponding to the scan-image-information from the image scanning section 3, the acquisition section 11 acquires candidates for the original image information by acquiring image information items relative to the user information corresponding to the scan-image-information, from the storage section 6.

With this arrangement, the candidates for the original image information are acquired based on the user information received from the image scanning section 3 and the user information stored in the storage section 6. More specifically, when acquiring the candidates for the original image information from the storage section 6, the acquisition section 11 acquires the items having the user information identical to the user information related to the scan-image-information. Further, the determination section 12 determines the original image information among the candidates for the original image information. In this manner, it is possible to more efficiently acquire the original image information.

Further, the image searching device 2 according to the present invention preferably further comprises: image scanning means for scanning the original image so as to produce the scan-image-information, wherein: the characteristic generating means associates the scan-image-information produced by the image scanning means with the characteristic extracted by the characteristic generating means, and stores the scan-image-information and the characteristic in the storage device.

With this arrangement, the scan-image information is scanned by the image scanning section 3, and is associated with the characteristic when stored in the storage section 6.

More specifically, the scan-image-information is created by scanning an original image by the image scanning means, and the created information is stored in the storage section 6. In this way, the scan-image-information associated with the characteristic can be automatically accumulated in the storage section 6.

Further, the image searching device 2 according to the present invention preferably further comprises: image data characteristic generation section 5 for extracting a characteristic from each of the image information items stored in the storage device.

With this arrangement, characteristic of the image information stored in the storage section 6 is extracted, allowing the acquisition section 11 to acquire candidates of original image information through comparison between the scan-image-information and the image information. Further, for example, when receiving only image information from outside of the device, the characteristic of image information can be created.

An image forming device 1 according to the present invention comprises: the foregoing image searching device 2 and an image forming section 8 for forming the scan-image-information or the original image information determined by the image searching device 2.

With this arrangement, image forming is carried out with respect to the scan-image-information and the original image information determined by the image searching device 2. On this account, when the original image information exists, image forming is carried out with respect to the found image information.

Further, the image forming device 1 according to the present invention preferably further comprises: compensation section 16 for compensating the scan-image-information when the scan-image-information is subjected to image forming, wherein: the compensation section 16 compensates the scan-image-information by using compensation information which is identical to the information regarding the area divided by the area division section 34.

With this arrangement, the scan-image-information is compensated when it is subjected to image forming, using the information regarding plural areas divided by the area dividing means. In other words, in the foregoing arrangement, the information used for the compensation by the compensating means is also used as the information regarding plural areas divided by the area dividing means. Accordingly, since the existing information used for the compensating means is used, it is not necessary to add area dividing means to the structure. On this account, acquisition of original image information is ensured without adding a new structure.

Further, an image searching method according to the present invention preferably comprises the steps of: (i) extracting a characteristic of scan-image-information, which is produced by an image scanning section 3 which scans an original image formed on a recording material according to original image information, so as to use the characteristic for specifying the scan-image-information; (ii) acquiring candidates for original image information corresponding to the scan-image-information, according to the characteristic, from a storage section 6 which stores a plurality of image information items; (iii) comparing each of the candidates for the original image information with the scan-image-information on a pixel basis; and (iv) determining the original image information corresponding to the scan-image-information, according to a result of comparison in the step (iii).

With this arrangement, some candidates for the original image information are acquired among the plurality of image information items stored in the storage section 6, and then the candidates of original image information are compared with the scan-image-information on the pixel basis. In this manner, the original image information, from which the original image is created, is determined.

Accordingly, this structure allows rapid and accurate determination of the original image information, from which the original image is created, compared with the conventional structure.

Note that, though the image forming device 1 includes the storage section 6 in the foregoing explanation, the storage section 6 may be provided in another device. More specifically, when the image forming device 1 is connected to a network, the storage section 6 may be provided on the server, allowing a plurality of image forming device 1 to access the storage section 6.

Further, though the scan-image-information is acquired by the image scanning section 3 in the foregoing example, the scan-image-information may be acquired from outside of the image forming device 1.

Further, though the foregoing example is arranged so that the image data characteristic generation section 5 extracts the characteristic from the image information received through the communication section 4, the characteristic may be extracted from the image information received through the communication section 4 by the characteristic generation section 10, as the same method is used for extraction of characteristic by the image data characteristic generation section 5 and for extraction of characteristic by the characteristic generation section 10. The image information is associated with a corresponding characteristic in the storage section 6 also in this case.

Further, though the foregoing example is arranged so that the storage section 6 stores a combination of image information and a corresponding characteristic, the storage section 6 may store only image information. For example, the characteristic corresponding to the image information may be extracted each time of comparison between the characteristic of the scan-image-information and the characteristic of the image information by the acquisition section 11 of the image searching device 2. However, it may be obvious but note that the structure in which the storage section 6 stores image information and a corresponding characteristic is preferable if the searching speed of the image searching device 2 is intended to be increased. That is to say, it is preferable that the corresponding characteristic of the image information in the storage section 6 is extracted before carrying out the comparison between the characteristic of the scan-image-information and the characteristic of the image information by the acquisition section 11.

Further, though the foregoing example is arranged so that the arbitration section 7 selects one of the scan-image-information obtained by the image scanning device 3 and original image information as the original image to be formed by the image forming section 8; the arbitration section 7 may be omitted. For example, it may be arranged so that either of the scan-image-information and the original image information is transmitted from the determination section 12 to the image forming section 8. The following more specifically describes this structure.

Though the scan-image-information scanned by the image scanning device 3 is transmitted to the arbitration section 7 in the foregoing example, the image scanning section 3 may transmit the scan-image-information only to the characteristic generation section 10. In this case, the original image information determination process performed by the determination section 12 is carried out as follows. When the determination section 12 determines that there in no original image information corresponding to the scan-image information, the determination section 12 transmits the scan-image-information to the image forming section 8. More specifically, when the determination section 12 finds the original image information corresponding to the scan-image-information, the determination section 12 outputs the original image information, and when the determination section 12 determines that there in no original image information corresponding to the scan-image information, the determination section 12 outputs the scan-image-information. With this structure, the arbitration section 7 may be omitted.

An image searching system according to the present embodiment includes an image scanning device, an image searching device 2, and an image forming device 1.

Further, the image forming device 1 according to the present embodiment may use the same structure for area dividing for gradation compensation of the scan-image-information by the compensation section 16 of the image forming section 8, and for area dividing for generating a characteristic by the characteristic generation section 10. More specifically, the characteristic generation section 10 and the compensation section 16 may be realized by the same section. The following more specifically explain this structure. First, the compensation section 16 is described.

Figure 6:
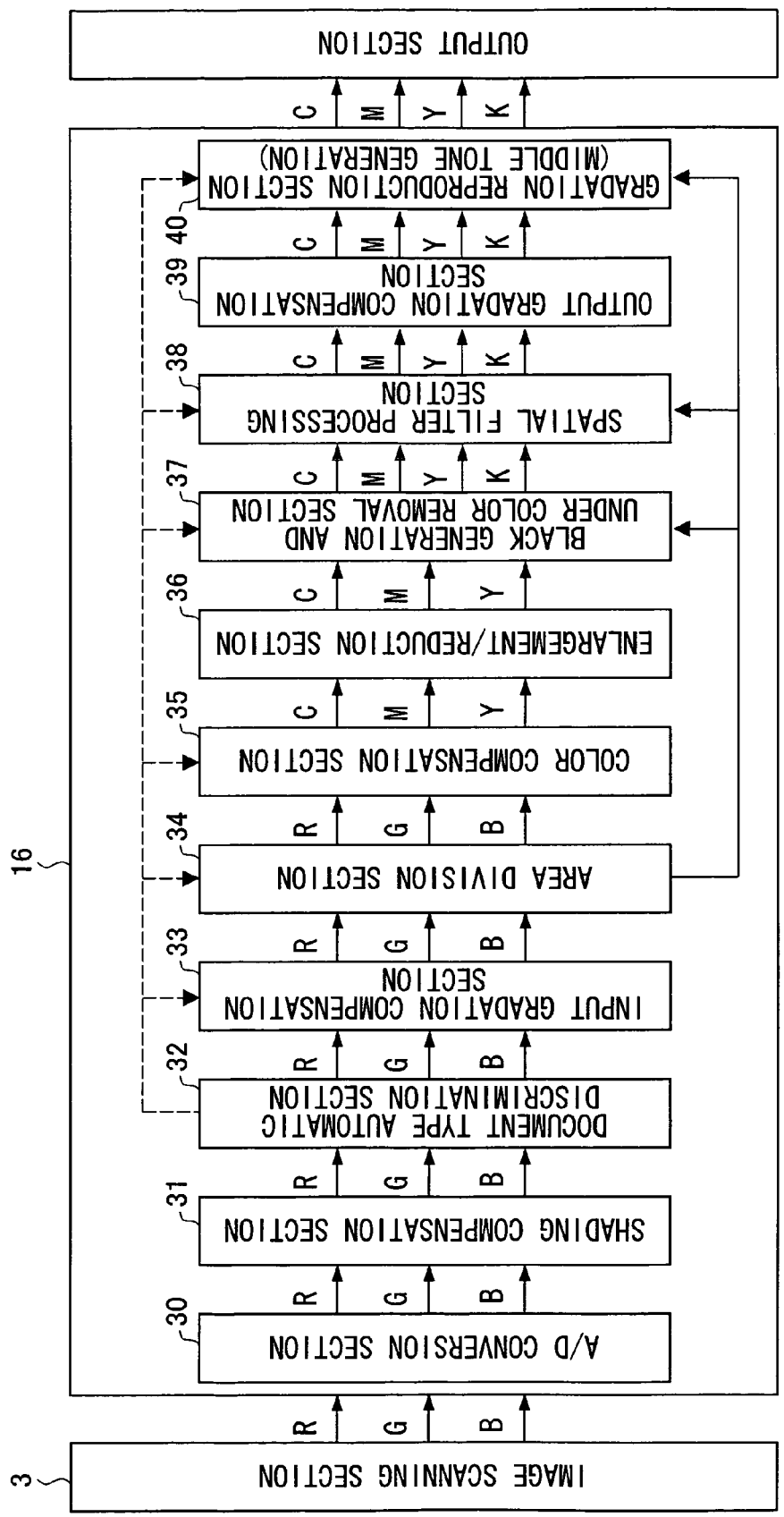
FIG. 6 is a block diagram illustrating a structure of compensation section.

FIG. 6 is a block diagram illustrating a structure of the compensation section 16. As shown in FIG. 6, the compensation section 16 includes an A/D conversion section 30, a shading compensation section 31, a document type automatic discrimination section 32, an input gradation compensation section 33, an area division section 34, a color compensation section 35, an enlargement/reduction section 36, a black generation under color removal section 37, a spatial filter processing section 38, an output gradation compensation section 39, and a gradation reproduction section 40. With this structure, the scan-image-information is inputted to the compensation section 16 from the arbitration section 7, and the compensation section 16 compensates gradation etc. of the scan-image-information before the output section carries out image forming of the scan-image-information.

The analog signal supplied from the image scanning section 3 via the arbitration section 7 is transmitted to the compensation section 16, and is transferred to the A/D conversion section 30, the shading compensation section 31, the document type automatic discrimination section 32, the input gradation compensation section 33, the area division section 34, the color compensation section 35, the enlargement/reduction section 36, the black generation under color removal section 37, the spatial filter processing section 38, the output gradation compensation section 39, and the gradation reproduction section 40 in this order. As a result, a digital signal of CMYK is outputted to the output section of the image forming section 8.

The A/D (Analog/Digital) conversion section 30 serves to convert an analog signal of RGB to a digital signal. The shading compensation section 31 serves to remove various distortions, such as distortion caused in the lighting system, the visualizing system, or in the image-capturing system, from the digital RGB signal transmitted from the A/D conversion section 30.

Getting rid of the various distortions in the shading compensation section 31, the RGB signal (RGB reflectance signal) is transmitted to the document type automatic discrimination section 32 where the signal is converted to a density signal or the like, which allows easy-handling in the image processing system adopted in the compensation section 16. Here, the document type automatic discrimination section 32 automatically determines whether the input original image is a text document, a photo document (printed photo, developed photo), or a document with text and photo.

The input gradation compensation section 33 serves to adjust the color balance. As well as this, input gradation compensation section 33 removes the base density, and carries out image adjustment, for example, in terms of contrast, based on the determination result by the document type automatic discrimination section 32.

The area division section 34 divides the all pixels of the input image according to the RGB signal into either of a character area, a halftone area, a continuous tone area, and a background area. According to the division result, the area division section 34 outputs an area identification signal, which indicates the area for each pixel of the input image, to the black generation under color removal section 37, the spatial filter processing section 38, and the gradation reproduction section 40. The area division section 34 also outputs a signal supplied from the input gradation compensation section 33 as such to the color compensation section 35 in the following stage.

The color compensation section 35 serves to remove color-muddiness based on the spectral characteristic of the CMY (C: Cyan, M: Magenta, Y: Yellow) color components, which contain unnecessary absorption component.

The black generation under color removal section 37 serves to generate a black signal (K) from the CMY signal, after this three-color signal is subjected to color compensation, and then subtracts the K signal from the original CMY signal, so as to produce a new four-colored CMYK signal.

The black generation may be carried out by a method using skeleton black (common method).

The enlargement/reduction section 36 serves to carry out variable power processing of image data outputted from the color compensation section 35 according to the desired magnification in image forming. The enlargement/reduction of the image are carried out by adding/taking a predetermined number of pixels, depending on the magnification.

The spatial filter processing section 38 carries out spatial filter processing by a digital filter or the like with respect to the image data of CMYK signal supplied from the black generation under color removal section 37, according to the area identification signal. This section serves to compensate the spatial frequency characteristic of the signal, thereby preventing decrease in graininess or blur of output image. Similar to this spatial filter processing section 38, the gradation reproduction section 40 also carries out a predetermined processing with respect to the image data of CMYK signal, according to the area identification signal.

For example, in a portion separated as a character area by the area division section 34, a high frequency is enhanced to a higher degree through sharpness enhancement, which is performed by the spatial filter of the spatial filter processing section 38, in order to improve reproductivity of black/color characters. At this time, the gradation reproduction section 40 selects either digitalization or multiplication in a high-resolution-screen suitable for high frequencies.

Further, in a portion separated as a halftone area by the area division section 34, the spatial filter processing section 38 carries out low-pass filter process to remove the input dot components.

Further, the output gradation compensation section 39 compensates gradation of output signal so that the density signal or the like is converted into a dot planar dimension, which is a characteristic of the output section. Then, the gradation reproduction section 40 carries out gradation reproduction process (middle tone generation). Then, the image is finally divided into pixels, allowing the gradation reproduction section 40 to process the image so that the respective gradations are properly reproduced. In a portion separated as a continuous tone area by the area division section 34, either digitalization or multiplication is selected in a screen suitable for gradation reproduction.

Further, the CMYK signal generated by the gradation reproduction section 40 is transmitted to the output section, and the image is formed.

With this arrangement, in the present embodiment, the characteristic generation section 10 corresponds to the A/D conversion section 30, the shading compensation section 31, the document type automatic discrimination section 32, the input gradation compensation section 33, and the area division section 34. That is, these components of the compensation section 16 are also used as the characteristic generation section 10. In other words, in the present embodiment, the compensation information used for compensation of the scan-image-information by the compensation section 16 is identical to the characteristic (information regarding the areas divided by the area division processing means) generated by the characteristic generation section 10.

The image forming device 1 according to the present embodiment may be arranged so that an original document of image data, which has been scanned by an image input device (image scanning section 3), is read out from an image data storage device (storage section 6) to be printed. The image forming device 1 includes a characteristic quantity generation section for generating a characteristic quantity used to extract candidates of original document image from the image data storage device; an candidate image searching section (acquisition section 11) for extracting candidates of original image according to the generated characteristic quantity; an image matching section (determination section 12) for selecting an original image among the candidates of the original image with reference to image data; a printing section (image forming section 8) for carrying out printing of the original image. That is, the image forming device 1 extracts candidates of original images according to the characteristic quantity, and the original image is selected from the extracted candidates of original images with a minute matching process. With this method of extracting candidates of original image according to the characteristic quantity, and carrying out a minute matching process, the original document can be quickly and accurately specified.

Further, the foregoing image forming device 1 according to the present embodiment may be arranged so that the characteristic generation section 10 includes a matching image generation section, which looks for data with less information amount than that of the original image, such as an area map used for generation of characteristic quantity, so as to use the data as a matching image used for the matching process. With this method of carrying out matching process with the data having a certain amount of image information, the original image is selected from restricted items. Therefore, the matching process can be performed more quickly, compared with the method of using only original documents.

Further, the foregoing image forming device 1 according to the present embodiment may be arranged so that the area map used for matching process is also used for image processing in the printing section at the following stage. With this arrangement, the matching image used for matching process is an area map which is also used in the printing section at the following stage, and therefore it is not necessary to prepare a separate area for the matching image in the image data storage device.

Further, the image forming device 1 according to the present embodiment may be arranged so that, in the process of matching, the difference between each candidate of the original image and the input image is found, and the one with a smaller value than a threshold is selected as the original image. With this arrangement, the difference between the selected original image and the input image is smaller than a threshold value, thereby reducing probability of using a wrong image as the original document.

Further, the image forming device 1 according to the present embodiment may use a planar dimension of the area map as the characteristic quantity. On this account, the characteristic quantity, which is used for discriminating the input image, can be produced by a simple operation.

Further, the image forming device 1 according to the present embodiment may be arranged so that a different area map is used as a matching image for the matching process, depending on the planar dimension of the target image. With this arrangement of changing the area map, the matching process can be performed with more accurate data.

Further, the image forming device 1 according to the present embodiment may generate a characteristic quantity and a matching image also on the general printing operation, and store them into the image data storage device with the image data. With this arrangement, the information used for matching is automatically generated on the general printing operation, and the user is not required to perform specific setting.

Further, the foregoing image forming device 1 according to the present embodiment may be arranged so that the user limitation information (user information) is also stored in the storage section 6, so as to further narrow down the document to be printed after the document is found by the search. With this arrangement, the security is further ensured for an image printing device, which actually prints the original document selected through the search in the image data storage section.

Further, the image forming device 1 according to the present invention may be arranged so that the user limitation information is used for extraction of candidates of the original image. With this arrangement of carrying out the search with the user limitation information, the search will become more efficient.

The image forming device 1 according to the present embodiment may be arranged so that the image forming device 1 further comprises a user input section for inputting the user information, wherein the user information and the image information are associated with each other in the storage section 6, and the acquisition section 11 acquires the candidates for the original image information based on the input user information. With this arrangement, the candidates for the original image information are acquired based on the user information received from the image scanning section 3 and the input user information. With this arrangement, the original image information can be acquired more efficiently.

Finally, the respective means of the image forming device 1 and the image searching device 2 may be constituted of a hardware logic, or may be realized by software with a CPU as follows.

Specifically, the image forming device 1, and the image searching device 2 of the present invention includes, for example, a CPU (Central Processing Unit) for enforcing instructions of an image forming method, i.e., enforcing the command for realizing the reading controlling means, the display controlling means, the comparing means, the operating means, the operation selecting means, the display information modifying means, and the comparison information modifying means; a ROM (Read Only Memory) for storing the program; a RAM (Random Access Memory) for developing the program; and a storage device (storage medium)

such as a memory for storing the program and the various data. Further, when the respective functions are realized as software, the program code (execute form program, intermediate code program, source program) of the control program of the image forming device 1 and the image searching device 2 is stored in a program medium readable by a computer, which medium is provided to the image forming device 1 and the image searching device 2. In this way, the objective of the present invention may also be achieved by reading out (enforcing) the program code stored in the storage medium by the computer (or, by CPU, MPU). In this case, the respective functions are enforced by the program code itself thus read out from the storage medium.

The storage medium may be (a) a tape system such as a magnetic tape, a cassette tape or the like, (b) a disk system which includes a magnetic disk such as a floppy disk®, a hard disk or the like and an optical disk such as a CD-ROM, an MO, an MD, a DVD or the like, (c) a card system such as an IC card (inclusive of a memory card), an optical card or the like, and (d) a semiconductor memory such as a mask ROM, an EPROM, an EEPROM, a flash ROM.

Further, the image forming device 1 and the image searching device 2 may be constituted to be connectable to a communication network, so as to allow provision of the program code via a communication network. The communication network is not particularly limited, and it may be: the Internet, Intranet, Extranet, LAN, ISDN, VAN, CATV communication network, virtual private network, telecommunication network, mobile body communication network, satellite communication network etc. Further, a transmission medium for constituting the communication network is not particularly limited, and it may be wired based, such as IEEE1394, USB, power-line carrier, cable TV line, telephone line, ADSL line, or radio based, such as infrared medium such as IrDA, remote control, Bluetooth, 802.11 radio, HDR, mobile phone network, satellite communication line, ground wave digital network. Note that, the present invention may be realized in the form of a carrier wave, or a data signal line that realize the program code by electronic transmission.

As described, in the present specification, the means does not necessarily denote physical means, but may denote software for realizing the means. Further, in the present invention, means with a specific single function may be realized by two separate pieces of physical means, or means with separate plural functions may be realized by a single piece of physical means.

Second Embodiment

The following explains another embodiment of the present invention with reference to Figures. For ease of explanation, materials having the equivalent functions as those shown in the drawings pertaining to the foregoing First Embodiment will be given the same reference symbols, and explanation thereof will be omitted here.

In the present embodiment, determination of original image information corresponding to the scan-image-information is carried out as follows. First, some candidates of image information are picked with reference to the foregoing characteristic. The candidates are further narrowed with reference to the matching image information. Finally, the selected image information is compared with the scan-image-information on the pixel basis. The following specifically describe these three processes for determining the original image information.

More specifically, in the present embodiment, matching image information is created in the characteristic generation step, and a list of candidates of original image information is created by using the matching image information in the original information determination step.

Further, in the present embodiment, the image information items used as candidates for the original image information corresponding to the scan-image-information are narrowed based on the user information, which is supplied through the user information input section. The following describes these processes.

Figure 7:
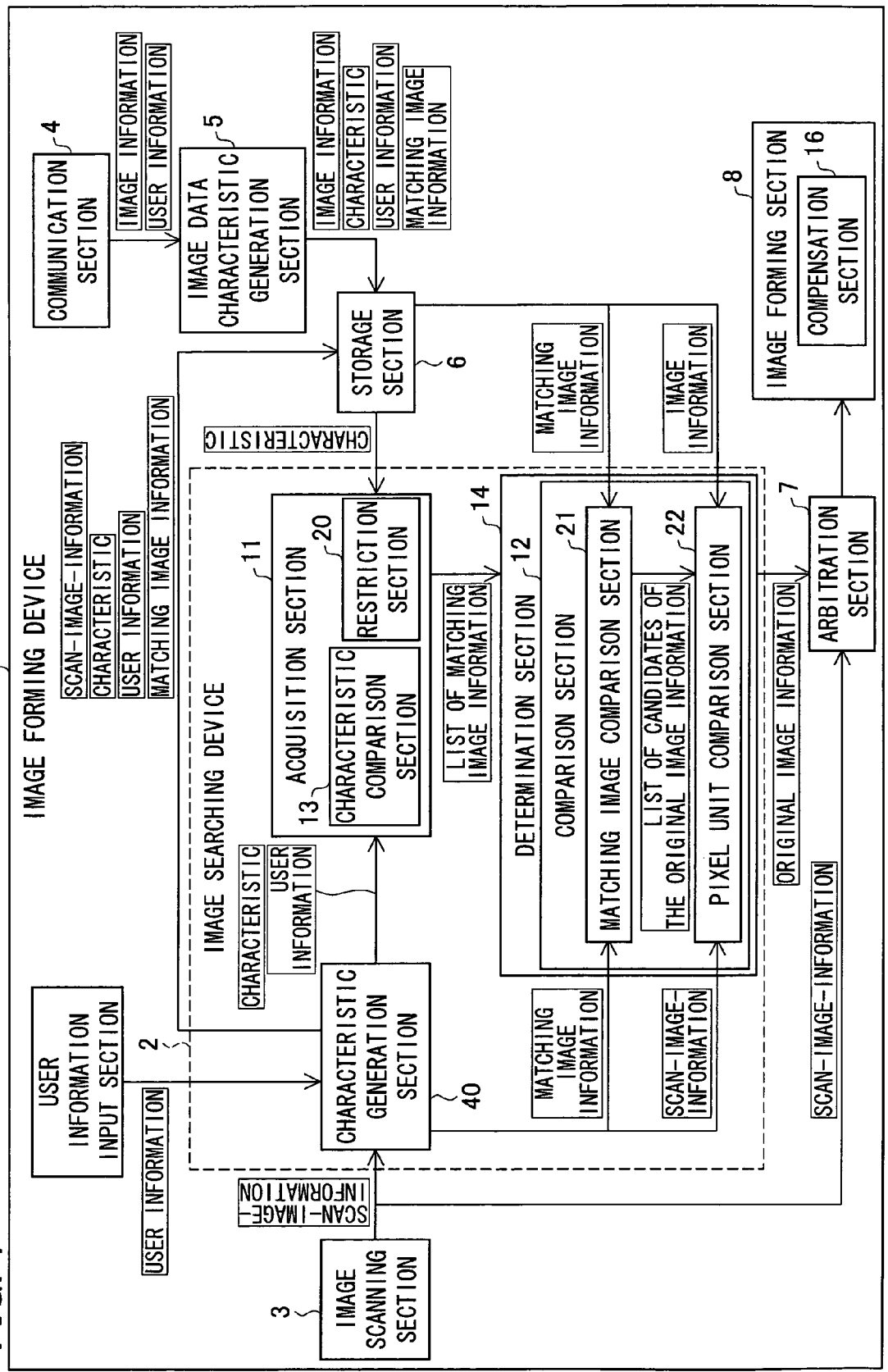
FIG. 7 is a block diagram illustrating a schematic structure of an image forming device according to another embodiment of the present invention.

FIG. 7 is a block diagram illustrating a schematic structure of an image forming device 1 according to the present invention.

The image forming device 1 includes an image scanning section 3, an user information input section, an arbitration section 7, an image forming section 8, an image searching device 2, a communication section 4, and an image data characteristic generation section 5.

Further, the image searching device 2 includes a characteristic generation section 40, an acquisition section 11 and a determination section 12. The acquisition section 11 includes a characteristic comparison section 13 and a restriction section 20. The determination section 12 includes a comparison section 14, and the comparison section 14 includes a matching image comparison section 21 and a pixel unit comparison section 22.

The characteristic generation section 40 according to the present embodiment serves to generate matching image information in addition to the foregoing characteristic, based on the scan-image-information received from the image scanning section 3. The matching information designates image information denoting the layout of at least one image area among the divided different type of areas (e.g., character area, halftone area, continuous tone area, background area etc.) with respect to the whole image expressed by the scan-image-information. For example, the matching image information may denote the position of character area in the entire image expressed by the scan-image-information, and has a function like a layout image or a preview image. Further, in the present embodiment, the characteristic may be a ratio of the character area, the halftone area, the continuous tone area, and the background area, which are produced by dividing the image expressed by the scan-image-information into plural rectangle areas, and classifying these areas according to the type of image.

The user information input section is used for external input of user information.

The restriction section 20 of the acquisition section 11 acquires characteristic from the storage section 6 based on the user information. More specifically, the acquisition section 11 serves to acquire a characteristic among the characteristics stored in the storage section 6, each of which is associated with one of the image information items, provided that the characteristic is associated with the user information identical to the received user information. That is, the restriction section 20 has a function of acquiring only the characteristic identified by the user information among the characteristics stored in the storage section 6. In other words, the restriction section 20 analyzes the user information so as to restrict acquisition of characteristic from the storage section 6.

The matching image comparison section 21 of the comparison section 14 serves to carry out comparison between the matching image information generated by the characteristic generation section 40, and the matching image information corresponding to the image information stored in the storage section 6. Note that, the matching image information has less amount of information than the scan-image-information or the actual image information.

The pixel unit comparison section 22 compares the scan-image-information and each image information item of the candidates for original image information, on the pixel basis.

The communication section 4 serves to receive image information and user information externally supplied. The image data characteristic generation section 5 serves to generate the characteristic and the matching image information based on the image information received via the communication section 4. Note that, the image data characteristic generation section 5 and the characteristic generation section 40 generate the characteristic and the matching image information with the same algorism; therefore they may be realized by a single member.

The storage section 6 serves to store the image information, the characteristic, the user information, and the matching image information, by associating them with each other.

Here, with reference to FIG. 7, the following explains a flow of operation of forming the original information created by the image scanning section 3. Note that, in the following explanation, there is a restriction for the image information (characteristic) available for the search, among the image information items stored in the storage section 6 associated with the user information.

First, the scan-image-information created by the image scanning section 3 is transmitted to the characteristic generation section 40 of the image searching device 2 and to the arbitration section 7. Further, to carry out image forming, the user inputs user information through the user information input section. Then, the input user information is transmitted to the characteristic generation section 40.

According to the received scan-image-information, the characteristic generation section 40 generates a characteristic and matching image information. Then, the characteristic generation section 40 transmits the characteristic and the user information to the acquisition section 11. Further, the characteristic generation section 40 transmits the generated matching image information to the matching image comparison section 21, and transmits the scan-image-information to the pixel unit comparison section 22.

Receiving the characteristic and the user information, the acquisition section 11 causes the restriction section 20 to acquire the characteristic approved by the received user information, from the storage section 6. Then, the characteristic comparison section 13 compares the characteristic of the scan-image-information and the characteristic acquired by the restriction section 20 and finds their difference. Then the all matching image information items corresponding to the characteristics with smaller difference values than a threshold are gathered as a list. Then, the acquisition section 11 transmits this list of matching image information items created by the characteristic comparison section 13 to the determination section 12.

Receiving the matching image information, the determination section 12 acquires a matching image from the storage section 6 by referring to the list of matching image information items, and transmits the matching image to the matching image comparison section 21.

The matching image comparison section 21 of the comparison section 14 compares the matching image information corresponding to the scan-image-information, received from the characteristic generation section 40, and the matching information corresponding to the image information acquired form the storage section 6, and finds their difference. Then the all matching image information items corresponding to the characteristics with smaller difference values than a threshold are gathered as a list. Then, the matching image comparison section 21 transmits this list of matching image information items to the pixel unit comparison section 22.

The pixel unit comparison section 22 acquires candidates for original image information from the storage section 6, according to the list of matching image information items given by the matching image comparison section 21. As well as this, the determination section 22 compares each candidate of original image information with the scan-image-information, received from the characteristic generation section 40, on the pixel basis. Then, according to the comparison result given by the pixel unit comparison section 22, the determination section 12 determines whether the candidates for the original image information include any items corresponding to the scan-image-information. When the corresponding information item is found in the candidates, the pixel unit comparison section 22 transmits the information item(s) corresponding to the scan-image-information to the arbitration section 7 as the original image information. In this way, the image searching device 2 searches original image information corresponding to the scan-image-information.

Figure 8:
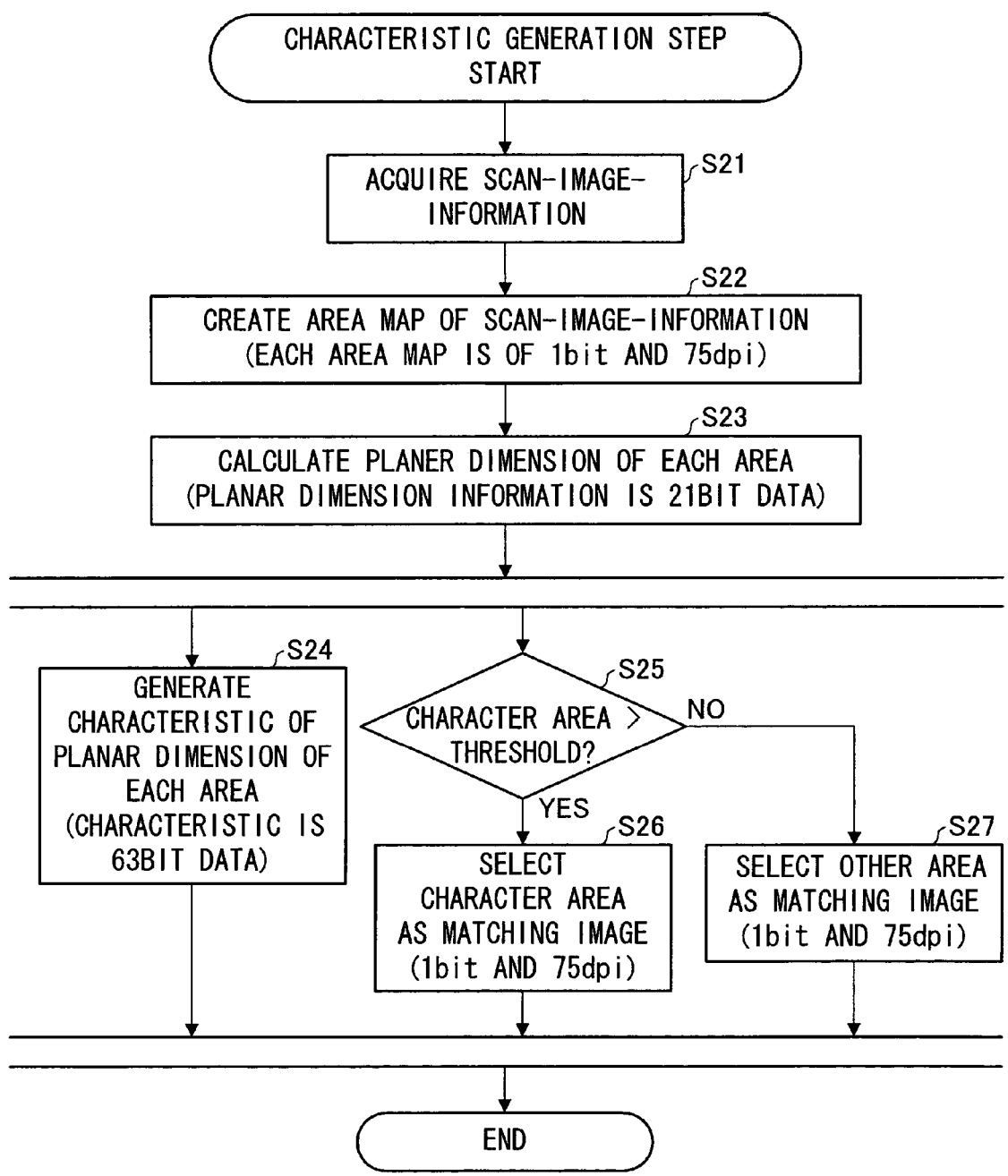
FIG. 8 is a flow chart for showing another characteristic generation step.

FIG. 8 is a flow chart for showing characteristic generation operation according to the present embodiment. The following describes this operation for generating characteristic and matching image information, which is performed by the characteristic generation section 40.

After the planar dimension of each area is calculated in the step S23, the characteristic generation section 40 figures out a characteristic according to the created planar dimension information (S24). At the same time, the characteristic generation section 40 also carries out judgment as to whether or not the ratio of the character area of the scan-image-information with respect to the whole scan-image-information is greater than a predetermined threshold (S25).

When the judgment in the step S25 founds that the ratio of the character area of the scan-image-information with respect to the whole scan-image-information is greater than the predetermined threshold, the characteristic generation section 40 creates matching image information by using the character area (S26). Here, the matching image information created by using the character area is data of 1 bit and 75 dpi.

When the judgment in the step S25 founds that the ratio of the character area of the scan-image-information with respect to the whole scan-image-information is equal to or less than the predetermined threshold, the characteristic generation section 40 creates matching image information by using the other area (S27). Here, the matching image information created by using the other area is data of 1 bit and 75 dpi. To be more specific, by creating the matching image information by using the area whose ratio with respect to the whole scan-image-information is greater than a predetermined threshold, it is possible to create matching image information more similar to the characteristic of the scan-image-information. In this way, the characteristic generation section 40 creates the matching image information.

Further, in contrast to the First Embodiment in which the list of original image information items is created in the characteristic comparison step, the present embodiment uses the matching image information items instead of the list of original image information items. Since the creating operation is similar to that of First Embodiment, the minute description is omitted here.

Figure 9:
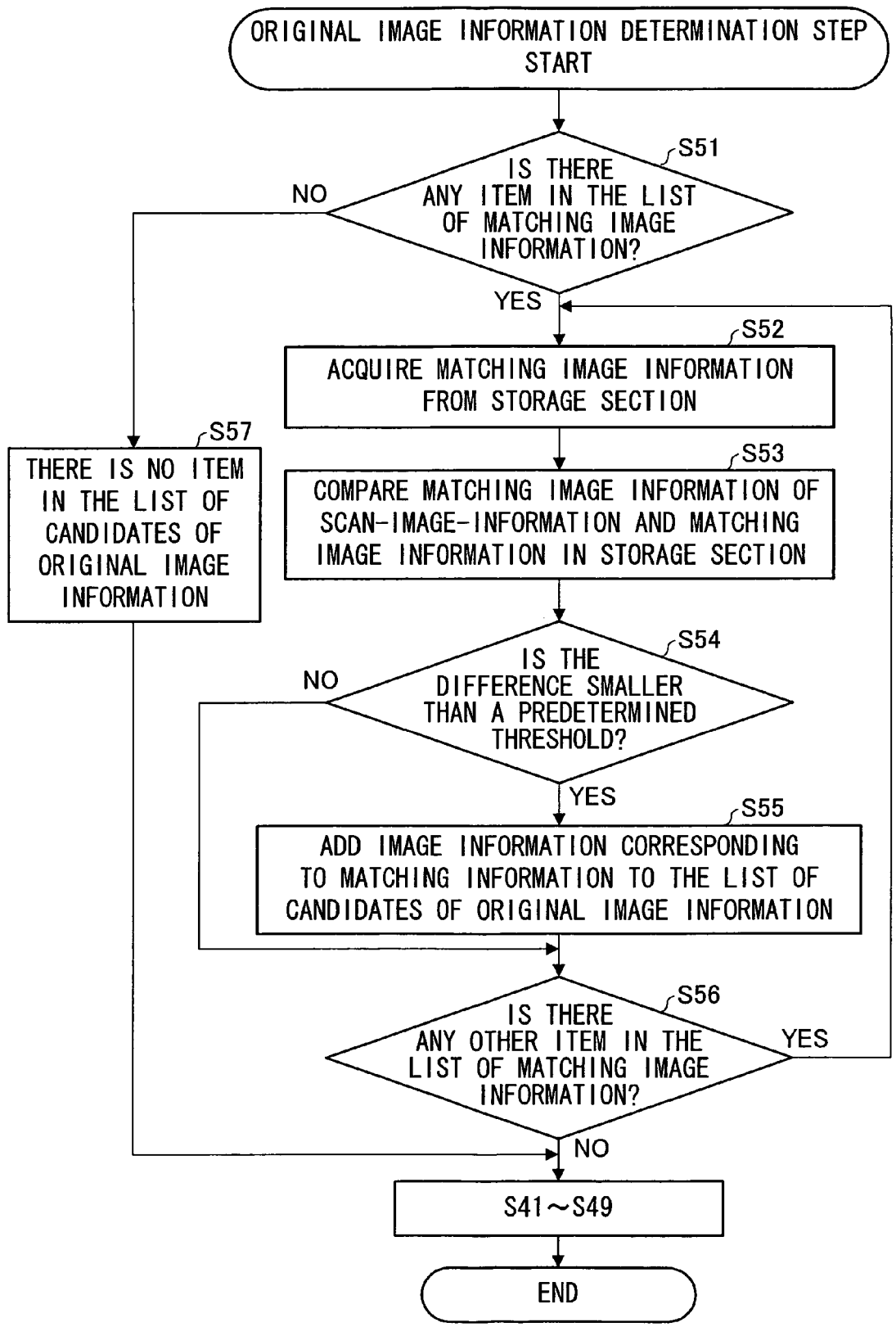
FIG. 9 is a flow chart for showing another original image information determination step.

FIG. 9 is a flow chart for showing original image information determination step according to the present embodiment. The following describes this method for determining the original image information, performed by the determination section 12.

First, the determination section 12 acquires matching image information corresponding to the scan-image-information, from the characteristic generation section 40. Then, the determination section 12 acquires a list of matching image information items from the acquisition section 11. Further, the determination section 12 carries out judgment as to whether or not there is any item in the list of candidates of the matching image information (S51).

When the step S51 found that there is one or more items are in the list of candidates of the matching image information, the determination section 12 acquires the item from the list of candidates of the matching image information. Then, the determination section 12 causes the matching image comparison section 21 of the comparison section 14 to compare the matching image information corresponding to the scan-image-information, and the matching information acquired from the storage section 6.

In other words, the matching image comparison section 21 compares the matching image information corresponding to the scan-image-information, and the matching information acquired from the storage section 6, and finds their difference (S53).

Referring to the comparison result given by the matching image comparison section 21, the determination section 12 determines whether the difference is smaller than a predetermined threshold (S54).

Then, when the step S54 found that the difference is smaller than the predetermined threshold, according the comparison result given by the matching image comparison section 21, the image information, corresponding to the matching information acquired from the storage section 6, is added to the list of candidates for the original image information (S55).

Next, the determination section 12 judges whether or not the list of matching image information includes any items which has not been compared with the characteristic of the scan-image-information (S56).

Then, when the step S56 found that the list of matching image information includes no matching information items for comparison, the sequence goes to the step S41. Meanwhile, when the step S56 found that there is an item which has not been subjected to comparison, the sequence goes to the step S51.

When the step S54 found that the difference is equal to or greater than the predetermined threshold, the sequence goes to the step S56.

Also, when the step S51 found that the list of candidates of the matching image information has no item, the determination section 12 determines that no item exists in the list of candidates of the matching image information, and the sequence goes to the step S41.

As described, in the present embodiment, the image information items stored in the storage section 6 are compared with the scan-image-information based on the characteristics, and then are further compared based on the matching image information. Then, the image information item selected as a result of these comparisons is regarded the most likely item for the original image information, and is finally compared with the scan-image-information on the pixel basis. On this account, the present invention achieves both improvement in image searching accuracy and quick operation, which have not been realized at the same time in the conventional methods.

The present invention is not limited to the description of the embodiments above, but may be altered by a skilled person within the scope of the claims. An embodiment based on a proper combination of technical means disclosed in different embodiments is encompassed in the technical scope of the present invention.

As one suitable example of usage of the image searching device according to the present invention, it can be used to carry out search before forming a scanned image, so as to find original image information corresponding to the scanned image; that is, to find image information from which the original image of the scanned image is created.

An image searching device according to the present invention comprises: characteristic generating means for (i) receiving scan-image-information produced by an image scanning device which scans an original image, which is formed on a recording material according to original image information, and for (ii) extracting a characteristic of the scan-image-information, which is used for specifying the scan-image-information; acquiring means for acquiring candidates for original image information corresponding to the scan-image-information, according to the characteristic, from a storage device which stores a plurality of image information items; comparing means for comparing each of the candidates for the original image information with the scan-image-information on a pixel basis; and determining means for determining the original image information corresponding to the scan-image-information, according to a result of comparison by the comparing means.

With this arrangement, the candidates for the original image information and the scan-image-information are compared with each other on the pixel basis, thereby more accurately determining original image information, compared with the conventional structure in which the original image information is determined only based on the characteristic of the scan-image-information. Further, this arrangement also allows rapid determination of the original image information, compared with the method of comparing the scan-image-information with all of the plural image information items stored in the storage device.

Accordingly, this structure allows rapid and accurate determination of the original image information, from which the original image is created, compared with the conventional structure.

The image searching device according to the present invention is preferably arranged so that the determining means narrows down the candidates for the original image information by selecting items whose difference is smaller than a predetermined threshold according to the result of comparison by the comparing means, and then further selecting a candidate with a smallest value as the original image information.

With this arrangement, each of the candidates for the original image information and the scan-image-information are compared by the comparing means, and the smallest item with the difference value less than the threshold is selected as the original image information. According to this, any data items with the difference equal to or more than the threshold value is excluded. Further, when there are plural candidates for the original image information with the difference smaller than the threshold, the smallest item is selected as the original image information. On this account, it is possible to reduce defect that the selected image information item turns out not corresponding to the scan-image-information.

The image searching device according to the present invention is preferably arranged so that the characteristic generating means divides the scan-image-information into a plurality of areas and determines a type of each area, the characteristic generating means extracting at least one ratio of type of area with respect to an entire area of the scan-image-information and/or positions of area of a specific type so as to use the ratio and/or the positions as the characteristic.

"Division of the scan-image-information into a plurality of areas" means dividing the scan-image-information corresponding to the plural divided areas of the image denoted by the scan-image-information. More specifically, the type of image for each area is found in a unit of 8×8 dot rectangle.

With this arrangement, the scan-image-information is divided into a plurality of areas, and the type of image for each area is found. Then, the candidates for the original image information are acquired based on one ratio of type of image with respect to the entire area of the scan-image-information and/or positions of area of a specific type so as to use the ratio and/or the positions as the characteristic.

With this manner, the image information items stored in the storage device can be easily classified, and it is not necessary to carry out comparison for all of the image information items in the storage device. On this account, the original image information is determined more quickly.

The image searching device according to the present invention is preferably arranged so that the characteristic generating means divides the scan-image-information into a plurality of areas and classifies the areas into a character area, a halftone area, a continuous tone area, and a background area, the characteristic generating means extracting a ratio of each area so as to use the ratio as the characteristic.

"Division of the scan-image-information into a plurality of areas" means dividing the scan-image-information corresponding to the plural divided areas of the image denoted by the scan-image-information.

With this arrangement, after the scan-image-information is divided into the plurality of areas, the resulting areas are classified into a character area, a halftone area, and a continuous tone area; and the ratio for each area is used as a characteristic, i.e., the factor of obtaining the candidates for the original image information. In this manner, the image information items in the storage device may be classified with a simpler method (and the original image information is acquired) than the pixel-basis comparison method, and then comparison for the selected candidate of original image information is carried out. This method allows further reduction in time for determining the original image information corresponding to the scan-image-information.

The image searching device according to the present invention is preferably arranged so that the characteristic generating means divides the scan-image-information into a plurality of areas and classifies the areas into a character area, a halftone area, a continuous tone area, and a background area, the characteristic generating means extracting ratios of the areas so as to use one of the ratios as the characteristic, the area of the ratio to be used as the characteristic being selected depending on the degree of the ratio.

With this arrangement, after the scan-image-information is divided into the plurality of areas, the resulting areas are classified into a character area, a halftone area, a continuous tone area, and a background area; and the ratio of one of the areas with respect to the whole scan-image-information is used as the factor of obtaining the candidates for the original image information. In this manner, the image information items in the storage device may be classified with an easy method, thereby further reducing the time for determining the original image information corresponding to the scan-image-information. Further, the area used for the factor of obtaining the candidates for the original image information is determined depending on the ratio of the area. More specifically, when the area used for the factor of obtaining the candidates for the original image information is significantly small, it includes a considerable amount of error, and acquisition of candidates for the original image information may not be properly carried out. In view of this problem, an area with a relatively large ratio with respect to the whole scan-image-information is used for the factor, so as to reduce the error. By thus determining the area used as the factor of obtaining the candidates for the original image information depending on the ratio of the area, the acquisition of candidates for the original image information is more securely performed.

The image searching device according to the present invention preferably further comprises: inputting means for inputting user information; and restricting means for restricting the candidates for the original image information acquired by the acquiring means, according to the user information, wherein: the storage device stores the user information by associating the user information with one of the image information items.

With this arrangement, the image information and the user information are related with each other, and the candidates for the original image information are narrowed down based on the user information supplied to the image searching device. This method allows the user to narrow down the determination in a desired way, for example, so that the original image information is given only to a specific user.

The image searching device according to the present invention preferably further comprises: restricting means for restricting the candidates for the original image information acquired by the acquiring means, according to user information, wherein: the storage device stores the user information by associating the user information with one of the image information items, the characteristic generating means acquires the scan-image-information and the user information corresponding to the scan-image-information from the image scanning device.

With this arrangement, the image information and the user information are related with each other, and the candidates for the original image information are narrowed based on the user information related to the scan-image-information. This method allows the user to narrow down the determination in a desired way, for example, so that the original image information is given only to a specific user.

The image searching device according to the present invention is preferably arranged so that: the storage device stores user information, which is associated with one of the image information items, the characteristic generating means acquires the scan-image-information and the user information corresponding to the scan-image-information from the image scanning device, the acquiring means acquires candidates for the original image information by acquiring image information items relative to the user information corresponding to the scan-image-information, from the storage device.

With this arrangement, the candidates for the original image information are acquired based on the user information received from the image scanning section and the user information stored in the storage device. More specifically, when acquiring the candidates for the original image information from the storage device, the acquiring means acquires the items having the user information identical to the user information related to the scan-image-information. Further, the determining means determines the original image information among the candidates for the original image information. In this manner, it is possible to more efficiently acquire the original image information.

The image searching device according to the present invention preferably further comprises: image scanning means for scanning the original image so as to produce the scan-image-information, wherein: the characteristic generating means associates the scan-image-information produced by the image scanning means with the characteristic extracted by the characteristic generating means, and stores the scan-image-information and the characteristic in the storage device.

With this arrangement, the scan-image information is scanned by the image scanning section, and is associated with the characteristic when stored in the storage device. More specifically, the scan-image-information is created by scanning an original image by the image scanning means, and the created information is stored in the storage device. In this way, the scan-image-information associated with the characteristic can be automatically accumulated in the storage device.

Further, the image searching device according to the present invention preferably further comprises: image information characteristic generating means for extracting a characteristic from each of the image information items stored in the storage device.

With this arrangement, characteristic of the image information stored in the storage section is extracted, allowing the acquisition section to acquire candidates of original image information through comparison between the scan-image-information and the image information. An image forming device according to the present invention comprises: the image searching device and image forming means for forming the scan-image-information or the original image information determined by the image searching device.

With this arrangement, image forming is carried out with respect to the scan-image-information and the original image information determined by the image searching device 2. On this account, when the original image information exists, image forming is carried out with respect to the found image information.

The image forming device according to the present invention preferably further comprises: compensating means for compensating the scan-image-information when the scan-image-information is subjected to image forming, wherein: the compensating means compensates the scan-image-information by using compensation information which is partly identical to the characteristic extracted by the characteristic generating means.

With this arrangement, when the scan-image-information is compensated according to the property of the image forming means, the scan-image-information is compensated by using compensation information, which is partly identical to the characteristic extracted by the characteristic generating means. Accordingly, since the characteristic is extracted by using the existing information, which is used by the compensating means, it is not necessary to add area dividing means to the structure. On this account, acquisition of original image information is ensured without adding a new structure.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A image searching device, comprising:
a characteristic generating section receiving scan-image-information produced by scanning an original image, and extracting a characteristic of the scan-image-information, which is used for specifying the scan-image-information;
an acquisition section acquiring candidates for original image information corresponding to the scan-image-information, according to the characteristic, from a storage device which stores a plurality of image information items;
a comparison section comparing each of the candidates for the original image information with the scan-image-information on a pixel basis; and
a determination section determining the original image information corresponding to the scan-image-information, according to a result of comparison by the comparison section, wherein:
the characteristic generating section divides the scan-image-information into a plurality of areas and determines a type of each area, the characteristic generating section extracting at least one ratio of type of area with respect to an entire area of the scan-image-information and/or positions of area of a specific type so as to use the ratio and/or the positions as the characteristic.

2. The image searching device as set forth in claim 1, wherein:
the determination section narrows down the candidates for the original image information by selecting items whose difference is smaller than a predetermined threshold according to the result of comparison by the comparison section, and then further selecting a candidate with a smallest value as the original image information.

3. The image searching device as set forth in claim 1, further comprising:
an inputting section inputting user information; and
a restricting section restricting the candidates for the original image information acquired by the acquisition section, according to the user information,
wherein:
the storage device stores the user information by associating the user information with one of the image information items.

4. The image searching device as set forth in claim 1, wherein:
the storage device stores user information, which is associated with one of the image information items,
the characteristic generating section acquires the scan-image-information and user information corresponding to the scan-image-information from the image scanning device, and the image searching device further comprises a restricting section restricting the candidates for the original image information acquired by the acquisition section according to the user information corresponding to the scan-image-information.

5. The image searching device as set forth in claim 1, wherein:
the characteristic generating section acquires the scan-image-information and the user information corresponding to the scan-image-information from the image scanning device,
the acquisition section acquires candidates for the original image information by acquiring image information items relative to the user information corresponding to the scan-image-information, from the storage device.

6. The image searching device as set forth in claim 1, further comprising:
an image scanning section scanning the original image so as to produce the scan-image-information,
wherein:
the characteristic generating section associates the scan-image-information produced by the image scanning section with the characteristic extracted by the characteristic generating section, and stores the scan-image-information and the characteristic in the storage device.

7. The image searching device as set forth in claim 1, further comprising:
an image information characteristic generating section extracting a characteristic from each of the image information items stored in the storage device.

8. A image searching device, comprising:
a characteristic generating section receiving scan-image-information produced by scanning an original image, and extracting a characteristic of the scan-image-information, which is used for specifying the scan-image-information:
an acquisition section acquiring candidates for original image information corresponding to the scan-image-information, according to the characteristic, from a storage device which stores a plurality of image information items;
a comparison section comparing each of the candidates for the original image information with the scan-image-information on a pixel basis; and
a determination section determining the original image information corresponding to the scan-image-information, according to a result of comparison by the comparison section, wherein:
the characteristic generating section divides the scan-image-information into a plurality of areas and classifies the areas into a character area, a halftone area, a continuous tone area, and a background area, the characteristic generating section extracting a ratio of each area so as to use the ratio as the characteristic.

9. A image searching device, comprising:
a characteristic generating section receiving scan-image-information produced by scanning an original image, and extracting a characteristic of the scan-image-information, which is used for specifying the scan-image-information;
an acquisition section acquiring candidates for original image information corresponding to the scan-image-information, according to the characteristic, from a storage device which stores a plurality of image information items;
a comparison section comparing each of the candidates for the original image information with the scan-image-information on a pixel basis; and
a determination section determining the original image information corresponding to the scan-image-information, according to a result of comparison by the comparison section, wherein:
the characteristic generating section divides the scan-image-information into a plurality of areas and classifies the areas into a character area, a halftone area, a continuous tone area, and a background area, the characteristic generating section extracting ratios of the areas so as to use one of the ratios as the characteristic, the area of the ratio to be used as the characteristic being selected depending on the degree of the ratio.

10. An image forming device, comprising:
a characteristic generating section receiving scan-image-information produced by scanning an original image, and extracting a characteristic of the scan-image-information, which is used for specifying the scan-image-information;
an acquisition section acquiring candidates for original image information corresponding to the scan-image-information, according to the characteristic, from a storage device which stores a plurality of image information items;
a comparison section comparing each of the candidates for the original image information with the scan-image-information on a pixel basis;
a determination section determining the original image information corresponding to the scan-image-information, according to a result of comparison by the comparison section; and
an image formation section forming the scan-image-information or the original image information, wherein:
the characteristic generating section divides the scan-image-information into a plurality of areas and determines a type of each area, the characteristic generating section extracting at least one ratio of type of area with respect to an entire area of the scan-image-information and/or positions of area of a specific type so as to use the ratio and/or the positions as the characteristic.

11. The image forming device as set forth in claim 10, further comprising:
a compensating section compensating the scan-image-information when the scan-image-information is subjected to image forming, wherein:
the compensating section compensates the scan-image-information by using compensation information which is at least partly identical to the characteristic extracted by the characteristic generating section.

\* \* \* \* \*